US008960595B2

(12) United States Patent
Roy

(10) Patent No.: US 8,960,595 B2
(45) Date of Patent: *Feb. 24, 2015

(54) WINGLESS HOVERING OF MICRO AIR VEHICLE

(71) Applicant: University of Florida Research Foundation, Inc., Gainesville, FL (US)

(72) Inventor: Subrata Roy, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/720,773

(22) Filed: Dec. 19, 2012

(65) Prior Publication Data
US 2013/0134263 A1 May 30, 2013

Related U.S. Application Data

(63) Continuation of application No. 12/342,583, filed on Dec. 23, 2008, now Pat. No. 8,382,029, which is a continuation-in-part of application No. PCT/US2007/074874, filed on Jul. 31, 2007.

(60) Provisional application No. 60/928,207, filed on May 8, 2007, provisional application No. 60/834,265, filed on Jul. 31, 2006.

(51) Int. Cl.
*B64C 39/00* (2006.01)
*B64C 39/02* (2006.01)

(52) U.S. Cl.
CPC ............ *B64C 39/001* (2013.01); *B64C 39/028* (2013.01); *B64C 39/00* (2013.01);
(Continued)

(58) Field of Classification Search
USPC ............ 244/199.1, 199.3, 200.1, 201, 204.1, 244/205, 23 R, 23 C
See application file for complete search history.

(56) References Cited

U.S. PATENT DOCUMENTS 3,150,483 A * 9/1964 Mayfield et al. ................ 60/202
3,177,654 A * 4/1965 Gradecak ........................ 60/202
(Continued)

FOREIGN PATENT DOCUMENTS

EP 1-524-189 A1 4/2005
WO WO-2008/016928 2/2008

OTHER PUBLICATIONS

Anderson, R. et al., "Preliminary Experiments of Barrier Discharge Plasma Actuators using Dry and Humid Air," 44th AIAA Aerospace Sciences Meeting and Exhibit, Jan. 9-12, 2006, Reno, NV, AIAA Paper No. 2006-0369.
(Continued)

*Primary Examiner* — Timothy D Collins
*Assistant Examiner* — Steven Hawk
(74) *Attorney, Agent, or Firm* — Saliwanchik, Lloyd & Eisenschenk

(57) ABSTRACT

Embodiments of the subject invention relate to an air vehicle and a power source. Embodiments can operate at reasonable power levels for hovering and withstanding expected wind gusts. Embodiments can have a diameter less than 15 cm. Embodiments can have one or more smooth (continuous curvature) surface and can be operated using electromagnetic and electrohydrodynamic principles. The wingless design of specific embodiments can allow operation with no rotating or moving components. Additional embodiments can allow active response to the surrounding flow conditions. The issue of low lift to drag ratio and degradation of airfoil efficiency due to the inability of laminar boundary layers attachment can also be significantly reduced, or eliminated. The electromagnetic force can be generated by applying a pulsed (alternating/rf) voltage between a set of grounded and powered electrodes separated by a polymer insulator, dielectric, or other material with insulating properties.

41 Claims, 24 Drawing Sheets

(52) U.S. Cl.
CPC ..... *B64C2201/027* (2013.01); *B64C 2201/042* (2013.01); *F05D 2270/172* (2013.01); *Y02T 50/166* (2013.01); *B64C 2230/12* (2013.01)
USPC ...... 244/23 C; 244/204.1; 244/205; 244/23 R

(56) References Cited

U.S. PATENT DOCUMENTS

| | | | |
|---|---|---|---|
| 5,669,583 | A | 9/1997 | Roth |
| 5,938,854 | A | 8/1999 | Roth |
| 6,200,539 | B1 * | 3/2001 | Sherman et al. ............... 216/67 |
| 6,247,671 | B1 | 6/2001 | Saeks et al. |
| 6,302,229 | B1 * | 10/2001 | Triebel ......................... 180/117 |
| 6,404,089 | B1 * | 6/2002 | Tomion ......................... 310/162 |
| 6,538,387 | B1 | 3/2003 | Seki et al. |
| 6,581,872 | B2 * | 6/2003 | Walmsley ..................... 244/12.2 |
| 7,096,660 | B2 * | 8/2006 | Keady .......................... 60/203.1 |
| 7,098,420 | B2 | 8/2006 | Crowe et al. |
| 7,183,515 | B2 * | 2/2007 | Miller et al. ............... 219/121.5 |
| 7,380,756 | B1 * | 6/2008 | Enloe et al. .................... 244/175 |
| 7,506,497 | B2 * | 3/2009 | Roy ................................ 60/202 |
| 7,509,795 | B2 * | 3/2009 | Allen .............................. 60/202 |
| 7,712,701 | B1 * | 5/2010 | Ehrmantraut et al. ....... 244/23 C |
| 7,857,256 | B2 * | 12/2010 | Hatton ......................... 244/23 C |
| 2004/0070349 | A1 * | 4/2004 | Keady ......................... 315/111.61 |
| 2004/0118973 | A1 | 6/2004 | Malmuth et al. |
| 2005/0121607 | A1 * | 6/2005 | Miller et al. .................... 250/287 |
| 2006/0005545 | A1 | 1/2006 | Samimy et al. |
| 2006/0131282 | A1 * | 6/2006 | Miller et al. ............... 219/121.5 |
| 2006/0150611 | A1 * | 7/2006 | Allen .......................... 60/203.1 |
| 2006/0218891 | A1 * | 10/2006 | Roy ............................ 60/203.1 |
| 2007/0119827 | A1 * | 5/2007 | Miller et al. ............. 219/121.51 |
| 2008/0023589 | A1 * | 1/2008 | Miles et al. .................... 244/205 |
| 2008/0213090 | A1 * | 9/2008 | Hatton ......................... 415/208.1 |

OTHER PUBLICATIONS

Colozza, A., "Planetary Exploration Using Biomimetics—An Entomopter for Flight on Mars," NIAC Fellows Conference, Jun. 11-12, 2002, Lunar and Planetary Institute, Houston, TX, Phase II Project NAS5-98051.

Enloe, C.L. et al., "Plasma Structure in the Aerodynamic Plasma Actuator", $42^{nd}$ Aerospace Sciences Meeting & Exhibit, Jan. 5-8, 2004, AIAA Paper No. 2004-0844.

Gaitonde, D.V. et al., "Control of Flow Past a Wing Section with Plasma-based Body Forces", $36^{th}$ AIAA Plasmadynamics and Lasers Conference, Jun. 6-9, 2005, Toronto, Canada, AIAA Paper No. 2005-5302.

Göksel, B. et al., "Drag Reduction and Propulsive Power by Electric Field Actuation," First International Industrial Conference Bionik 2004, Session Fluiddynamics II, Apr. 22-23, 2004, Convention Center of the Hannover Exhibition.

Göksel, B., "MEMS Plasma Actuators for Separation Flow Control", Workshop zum Thema Unbemannte Flugzeuge, EADS Military Air Systems, May 31-Jun. 1, 2006, XP-002458965.

Hultgren, L.S. et al., "Demonstration of Separation Delay With Glow-Discharge Plasma Actuators," $41^{st}$ Aerospace Sciences Meeting and Exhibit, Jan. 6-9, 2003, Reno, NV, AIAA Paper No. 2003-1025.

Jüttner, B., "Characterization of the Cathode Spot," *IEEE Transactions on Plasma Science*, Oct. 1987, pp. 474-480, vol. PS-15, No. 5.

Kellog, J., et al., "Development and Testing of Unconventional Micro Air Vehicle Configurations," $2^{nd}$ AIAA "Unmanned Unlimited" Systems, Technologies, and Operations—Aerospace, Sep. 15-18, 2003, San Diego, CA, AIAA Paper No. 2003-6656.

Kimmel, R. et al., "Effect of Magnetic Fields on Surface Plasma Discharges at Mach 5," *Journal of Spacecraft and Rockets*, Nov.-Dec. 2006, pp. 1340-1346, vol. 43, No. 6.

Kumar, H. et al., Multidimensional hydrodynamic plasma-wall model for collisional plasma discharges with and without magnetic-field effects, *Physics of Plasmas*, 2005, pp. 093508-1 to 093508-10, vol. 12.

Leonov, S.B. et al., "Hypersonic/Supersonic Flow Control by Electro-Discharge Plasma Application," $11^{th}$ AIAA/AAAF International Symposium Space Planes and Hypersonic Systems and Technologies, Sep. 29-Oct. 4, 2002, AIAA Paper No. 2002-5209.

Leonov, S, et al., "The Effect of Plasma Induced Separation," AIAA , Jun. 23-26, 2003, AIAA Paper No. 2003-3852.

Menart, J., et al. "Coupled radiative, flow and temperature-field analysis of a free-burning arc," *Journal of Physics D: Applied Physics*, 2000, pp. 257-269, vol. 33.

Miles, R.B., "Flow Control by Energy Addition into High-Speed Air," AAIA Paper No. 2000-2324.

Roth, J.R., Aerodynamic flow acceleration using paraelectric and peristaltic electrohydrodynamic effects of a One Atmosphere Uniform Glow Discharge Plasma, *Physics of Plasmas*, May 2003, pp. 2117-2126, vol. 10, No. 5.

Roy, S. et al., "Effective Conversion of Exit Enthalpy in a MPD Thruster," $40^{th}$ Aerospace Sciences Meeting, Jan. 14-18, 2002, Reno, NV, AIAA Paper No. 2002-0917.

Roy, S. et al., "Modeling low pressure collisional plasma-sheath with space-charge effect," *Physics of Plasmas*, Jun. 2003, pp. 2578-2585, vol. 10, No. 6.

Roy, S., "Self Consistent Electrode Model for Magnetoplasmadynamic Thrusters," 40th AIAA/ASME/SAE/ASEE Joint Propulsion Conference, Ft. Lauderdale, FL, 2004, AIAA paper No. 2004-3469.

Roy S. et al., Radio frequency induced ionized collisional flow model for application at atmospheric pressures, *J. Appl. Physics*, Sep. 1, 2004, pp. 2476-2481, vol. 96, No. 5.

Roy, S., "Flow actuation using radio frequency in partially-ionized collisional plasmas," *Applied Physics Letters*, 2005, pp. 101502-1 to 101502-3, vol. 86.

Roy, S. et al., "Modeling Surface Discharge Effects of Atmospheric RF on Gas Flow Control," $43^{rd}$ AIAA Aerospace Sciences Meeting and Exhibit, Jan. 10-13, 2005, Reno, NV, AIAA Paper No. 2005-0160.

Roy, S. et al., "Effective Discharge Dynamics for Plasma Actuators," $44^{th}$ AIAA Aerospace Sciences Meeting and Exhibit, Jan. 9-12, 2006, Reno, NV, AIAA Paper No. 2006-0374.

Roy, S., et al., "Force interaction of high pressure glow discharge with fluid flow for active separation control," *Physics of Plasma*, 2006, pp. 023503-1 to 023503-11, vol. 13.

Roy, S., et al., "Dielectric barrier plasma dynamics for active control of separated flows," *Applied Physics Letters*, 2006, pp. 121501-1 to 121501-3, vol. 88.

Shang, J.S. et al., "Blunt Body in Hypersonic Electromagnetic Flow Field," *Journal of Aircraft*, Mar.-Apr. 2003, pp. 314-322, vol. 40, No. 2.

Shneider, M. N. et al., "Nonequilibrium Magnetohydrodynamic Control of Scramjet Inlets," $33^{rd}$ AIAA Plasmadynamics and Lasers Conference, May 20-23, 2002, Maui, HI, AIAA Paper No. 2002-2251.

Singh, K.P. et al., "Simulation of an asymmetric single dielectric barrier plasma actuator," *Journal of Applied Physics*, 2005, pp. 083303-1 to 083303-7, vol. 98.

\* cited by examiner

- Lift is 0 at the beginning of the stroke.

- Increases and achieves its extreme value in the second half of the downstroke.

- Begins to lessen at the end of the downstroke.

- Becomes negative throughout the upstroke.

WINGLESS HOVERING OF MICRO AIR VEHICLE

CROSS-REFERENCE TO RELATED APPLICATIONS

This application is a continuation of U.S. application Ser. No. 12/342,583, filed Dec. 23, 2008, which is a continuation-in-part of International Patent Application No. PCT/US2007/074974, filed Jul. 31, 2007, which claims the benefit of U.S. Application Ser. No. 60/928,207, filed May 8, 2007, and claims the benefit of U.S. Application Ser. No. 60/834,265, filed Jul. 31, 2006, the disclosures of which are hereby incorporated by reference herein in their entirety, including any figures, tables, or drawings.

BACKGROUND OF INVENTION

Typical unmanned aerial vehicles (UAVs) are less than 15 cm with wingspan. In traditional winged MAVs, the control surfaces are open to the wind and thus very sensitive to wind gusts, at speeds comparable to vehicle flight speeds.

The traditional lift generation mechanism in a micro air vehicle (MAV), is shown in FIG. 1A. Referring to the top of FIG. 1A, air moves over the wing surface with no separation such that the conventional airfoil produces a steady state standing vortex trailing the wing. This vortex does not effect lift generation by the wing. As shown at the bottom of FIG. 1A, flapping wings, can generate a vortex tube with each stroke to produce lift. Referring to the bottom portion of FIG. 1A, a bound vortex is formed after each stroke of the flapping wing pair, where two bound vortexes are shown in FIG. 1A. The bound vortexes create a three-dimensional wake structure that can be considered as a vortex tube. The bound vortex formed after each stroke is the source of lift for the flapping wing pair. The magnitude of this lift force is, however, unsteady. The nature of the magnitude of the lift force produced by the vortex tube resulting from flapping wings is plotted in FIG. 1B. While the flapping wing theoretically mimics insects and birds in nature, the lift generated due to rigid flapping wings may be easily disrupted with the rupture of this vortex tubes at moderate wind gusts. The disruption of the lift caused by the rupture of the vortex tube results in a serious limitation to the hovering capability of a MAV using a flapping rigid wing. The main difference between flapping flight and airfoil flight is the continued formation and shedding of the wing vortex in flapping flight.

There has been a significant experimental and theoretical effort in the area of magnetohydrodynamics (MHD) control of high-speed air flows. The effects of external magnetic field on plasmas have been investigated for flow control purposes. Beyond the first computational demonstration by Bush (1958), Zimmer (1969) showed that a strong magnetic field and plasma altered the standoff distance of a bow shock in front of a hemispherical body by a factor of 7.5. More recently, investigators (Menart et al.) have shown that a magnetic field in combination with plasma does alter the flow field. The precise mechanism though, is still unclear.

Electric body forces produced by a radio frequency (rf) induced surface dielectric barrier discharge (DBD) can be employed for low-speed flow control. One such application is to re-attach separated flows through induced wall jet (Roth, 2003; Corke et al, 2005; Roy and Gaitonde, 2005; Gaitonde et al. 2006).

There exists a need in the art for a MAV that is less sensitive to wind gusts than traditional winged MAV's.

BRIEF SUMMARY

Embodiments of the subject invention relate to a Wingless Hovering Micro Air Vehicle (WHOMAV). Embodiments of the WHOMAV can incorporate a Power Source Unit (PSU), which can include, for example, batteries, or other appropriate power sources known in the art. Embodiments can operate at reasonable power levels for hovering and withstanding expected wind gusts. Embodiments of the subject invention can have a diameter less than 15 cm. Other embodiments can have a diameter up to 1 meter, or larger. Embodiments can have one or more smooth (continuous curvature) surface and can be operated using electromagnetic and/or electrohydrodynamic principles. The wingless design of specific embodiments can allow operation with no rotating or moving components.

Additional embodiments can allow active response to the surrounding flow conditions. The issue of low lift to drag ratio and degradation of airfoil efficiency due to the inability of laminar boundary layers attachment can also be significantly reduced, or eliminated. The electromagnetic force can be generated by applying a pulsed (alternating/rf) voltage between a set of grounded and powered electrodes separated by a polymer insulator, dielectric, or other material with insulating properties. DC currents applied to such electrodes can also be utilized to provide the force. In a specific embodiment, a permanent magnet, or other source of magnetic field such as an electromagnet can be used to create a magnetic field in the device so as to create a selective bias force on a current carrying conductor (J×B). The current in the conductor and/or strength of the B field can be altered to adjust the force.

While the physical weight of the subject wingless WHOMAV design can be similar to the weight of traditional winged micro air vehicles (MAVs), embodiments of the subject WHOMAV can offer one or more of the three following advantages. First, an internal surface can control the motion, where the internal surface is not exposed to wind gusts and, thus, is minimally affected by the unsteadiness of the surrounding flow. Second, an internal core and external curved surfaces can be utilized to control the inertia by manipulating the acceleration in the vertical direction. Third, the wind load on an annular disc in neutral equilibrium is at or near the minimum. The body of the WHOMAV can have various designs and shapes. In a specific embodiment, the body is designed to minimize the load from wind. An example of body design includes, but is not limited to, a disc shape. Embodiments of the subject invention can incorporate one or more additional techniques for improving energy efficiency, such as the use of micro actuators. Embodiments can be unique in their response to maneuverability and gust tolerance. Specific embodiments can adequately manage massive, time-dependent separations that would otherwise stall traditional wings.

The wingless design in accordance with the subject invention can be incorporated for with various additional applications, in addition to practical MAVs. Experimental testing and numerical modeling can be used for finding correlation between flow field dynamics, electromagnetic configurations, and consequent response to flight mechanics. Numerical optimization and testing for weight and efficiency can be implemented to optimize the design. The lift mechanism utilized for the wingless design can also be incorporated with a winged MAV. Additionally, the separated flows at low Reynolds number condition associated with the MAVs can be minimized using accurate control of the electrodynamic body force through a feedback mechanism. An unconventional MEMS local skin friction/shear stress sensor may also be used to detect flow response. In response to the detected flow response, which may result from environmental wind and/or wind gusts, various permutations of the electrodes can be driven to create forces to accommodate for the detected flow response.

BRIEF DESCRIPTION OF DRAWINGS

FIG. 1A shows a trailing vortex arising from flow over a traditional airfoil wing and an example in which vortex tube generation supports lift with flapping wings, and FIG. 1B illustrates the magnitude of the lift during the flapping cycle with flapping wings and the unsteady nature of this lift.

FIG. 2A shows an example of paraelectric, FIG. 2B shows an example of peristaltic poly-phase flow control, FIG. 2C shows a standard monolayer design, and FIG. 2D shows how the discharge induces a weak local wall air jet (U~1-2 m/s).

FIG. 3A shows a schematic of an embodiment for flow actuation using surface DBD, FIG. 3B describes a localized peak in the vicinity of the exposed electrode, and FIG. 3C shows the streamwise gas velocity profiles along different directions.

FIG. 4A shows a space charge distribution over the dielectric that confirms negative charge accumulation and effect of electrode shape on induced body force, and FIG. 4B shows force and flow attachment results that confirm the peristaltic effect due to phase lag.

FIG. 5A shows a schematic of the embodiment, and FIG. 5B shows an electrode arrangement of the embodiment.

FIG. 6A shows a multilayer design schematic of the embodiment, for improved actuator performance, FIG. 6B shows how the steady discharge induces significantly large body force in an extended region, resulting in a possible order of magnitude increase in wall jet velocity, and FIG. 6C shows another electrode layout that can be used to induce a large body force in an extended region.

FIG. 19A shows electrode coated coaxial square pipes, and FIG. 19B shows electrode coated coaxial cylinders.

FIG. 20A shows a cut-away, FIG. 20B shows lift and thrust generation mechanisms, and FIG. 20C shows a hover stability control mechanism.

DETAILED DISCLOSURE

Figure 1A:
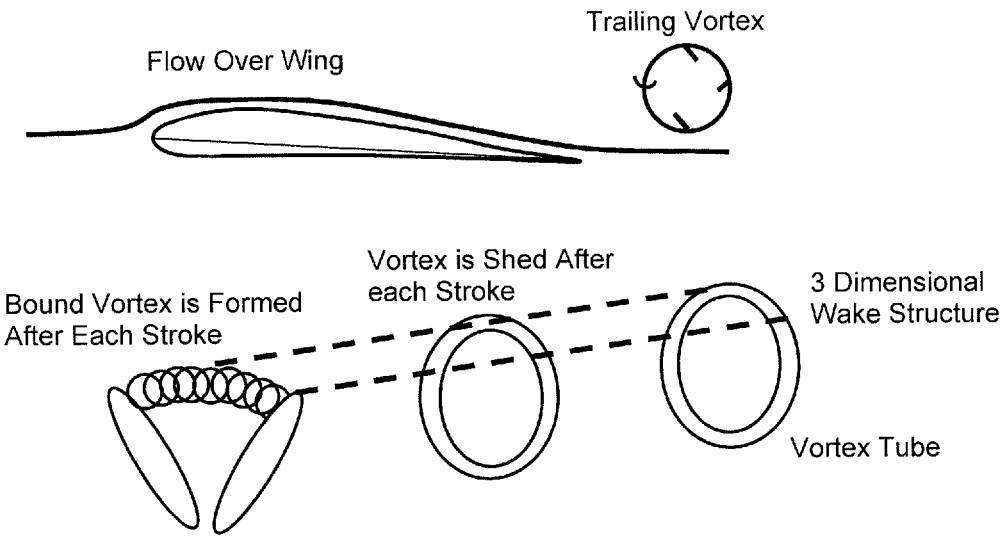
FIGS. 1A and 1B show flight dynamics for traditional winged micro air vehicles, where

Embodiments of the subject invention relate to a Wingless Hovering Micro Air Vehicle (WHOMAV). Embodiments of the WHOMAV can incorporate a Power Source Unit (PSU), which can include, for example, batteries, or other appropriate power sources known in the art. Embodiments can operate at reasonable power levels for hovering and withstanding expected wind gusts. Embodiments of the subject invention can have a diameter less than 15 cm. Embodiments can have one or more smooth (continuous curvature) surface and can be operated using electromagnetic and/or electrohydrodynamic principles. The wingless design of specific embodiments can allow operation with no rotating or moving components. Additional embodiments can allow active response to the surrounding flow conditions. The issue of low lift to drag ratio and degradation of airfoil efficiency due to the inability of laminar boundary layers attachment can also be significantly reduced, or eliminated. The electromagnetic force can be generated by applying a pulsed (alternating/rf) voltage between a set of grounded and powered electrodes separated by a polymer insulator, dielectric, or other material with insulating properties. DC currents applied to such electrodes can also be utilized to provide the force. In a specific embodiment, a permanent magnet, or other source of magnetic field such as an electromagnet can be used to create a magnetic field in the device so as to create a selective bias force on a current carrying conductor (J×B). The current in the conductor and/or strength of the B field can be altered to adjust the force.

While the physical weight of the subject wingless WHOMAV design can be similar to the weight of traditional winged micro air vehicles (MAVs), embodiments of the subject WHOMAV can offer one or more of the three following advantages. First, an internal surface can control the motion, where the internal surface is not exposed to wind gusts and, thus, is minimally affected by the unsteadiness of the surrounding flow. Second, an internal core and external curved surfaces can be utilized to control the inertia by manipulating the acceleration in the vertical direction. Third, the wind load on an annular disc in neutral equilibrium is at or near the minimum. The body of the WHOMAV can have various designs and shapes. In a specific embodiment, the body is designed to minimize the load from wind. An example of body design includes, but is not limited to, a disc shape. Embodiments of the subject invention can incorporate one or more additional techniques for improving energy efficiency, such as the use of micro actuators. Embodiments can be unique in their response to maneuverability and gust tolerance. Specific embodiments can adequately manage massive, time-dependent separations that would otherwise stall traditional wings.

The wingless design in accordance with the subject invention can be incorporated for with various additional applications, in addition to practical MAVs. Experimental testing and numerical modeling can be used for finding correlation between flow field dynamics, electromagnetic configurations, and consequent response to flight mechanics. Numerical optimization and testing for weight and efficiency can be implemented to optimize the design. The lift mechanism utilized for the wingless design can also be incorporated with a winged MAV. Additionally, the separated flows at low Reynolds number condition associated with the MAVs can be minimized using accurate control of the electrodynamic body force through a feedback mechanism. An unconventional MEMS local skin friction/shear stress sensor may also be used to detect flow response.

Embodiments of the invention can generate lift by electrodynamic forces, which can be made steady and accurately controlled in localized fashion for the desired time duration. There can be advantages from using electrodynamic force for flow control for many, if not all, speed regimes encountered in aerospace applications. In addition to the absence of moving parts and rapid switch-on/off capabilities, electromagnetic devices have the ability to apply large forces in a relatively precise manner. Recent experiments (Roth, 2003; Enloe et al., 2003) and numerical studies (Roy, 2005; Roy and Gaitonde, 2006a,b; Gaitonde et al., 2005, 2006) have successfully demonstrated striking flow control effects of radio frequency (rf) induced dielectric barrier discharge (DBD) at low speeds and are hereby incorporated by reference for the teaching of such rf induced dielectric barrier discharge techniques that can be incorporated with embodiments of the subject invention. These rf induced dielectric barrier discharge devices, which can be termed plasma actuators, operate at reasonable power (watts), but can lose performance at higher flow speeds where the magnetic field needed to be applied to induce additional Lorentz force for effective control, can increase power requirement to kWs (Miles, 2000; Leonov and Bityurin, 2002). Embodiments of the subject invention, incorporating a wingless design can offer one or more of the following advantages: (a) significantly less power requirement, (b) no rotating mechanism leaving a turbulent signature, and (c) accurate control for generating sufficient lift and cruise speed under reasonable gust condition. In order to generate higher flight speed, the application of a small magnetic field can be beneficial. Electric body forces qE can be used to replace the wings of a traditional winged MAV.

FIG. 2 shows schematics of kHz level rf induced atmospheric glow discharge for paraelectric (in FIG. 2A) and peristaltic (in FIG. 2B) flow acceleration respectively at low speed. In surface discharge, an example of which is shown in FIG. 2B, one electrode is typically exposed to the flow surface, while the other electrode is embedded in a layer of insulator and displaced a short streamwise distance from the electrode exposed to the surface. This standard arrangement can be referred to as the monolayer design. In an embodiment, the electrode exposed to the flow surface can have a dielectric coating between the electrode and the flow environment. The electric field generated by the discharge is a consequence of this geometric asymmetry as well as that associated with the vastly disparate mobility of the electrons and ions respectively. The net forces generated by the intermittent discharge induce ion-"wind", while ion-neutral collision transfer mechanisms generate the desired surface wall-jet-like effect (Roy and Gaitonde, 2006; Roy et al, 2006).

The response of the fluid to these forces requires the solution of the full fluid equations past complex configurations under conditions where transition and turbulence are dominant (Gaitonde et al., 2005, 2006). An embodiment of the standard monolayer design of Hultgren and Ashpis (AIAA-2003-1025), (FIG. 2C) with the results of testing the embodiment shown in (FIG. 2D) which was based on Corke et al. (2002). The discharge induces body force in a small region resulting in a weak wall jet (Anderson and Roy, AIAA-2006-369). Application of polyphase rf power supply to the electrodes can nearly double (Roth, 2003; Roy et al., 2006; Roy and Singh, 2006) the induced velocity as schematically shown in the right end of FIG. 2B. Such a structure and polyphase rf power supply can be incorporated with embodiments of the subject invention. However, this can require reasonable power and an expensive power supply. This design can require kHz rf power supply and can arc (see arrow in FIG. 2C), making the discharge unstable.

Figure 3A:
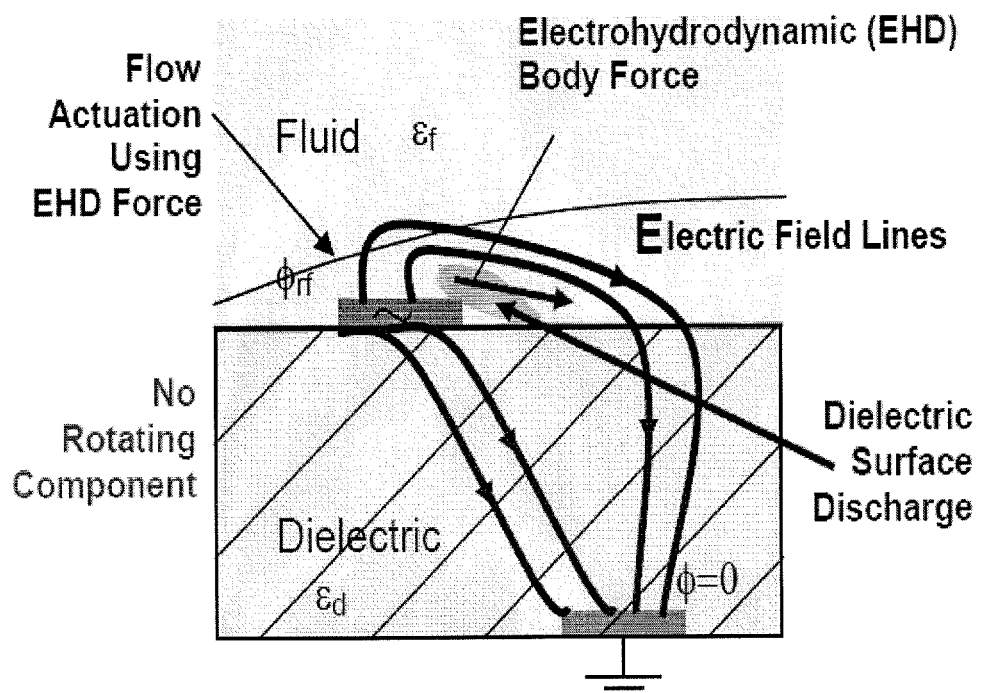
FIGS. 3A-3C show plasma actuation of quiescent helium gas, where
Figure 3B:
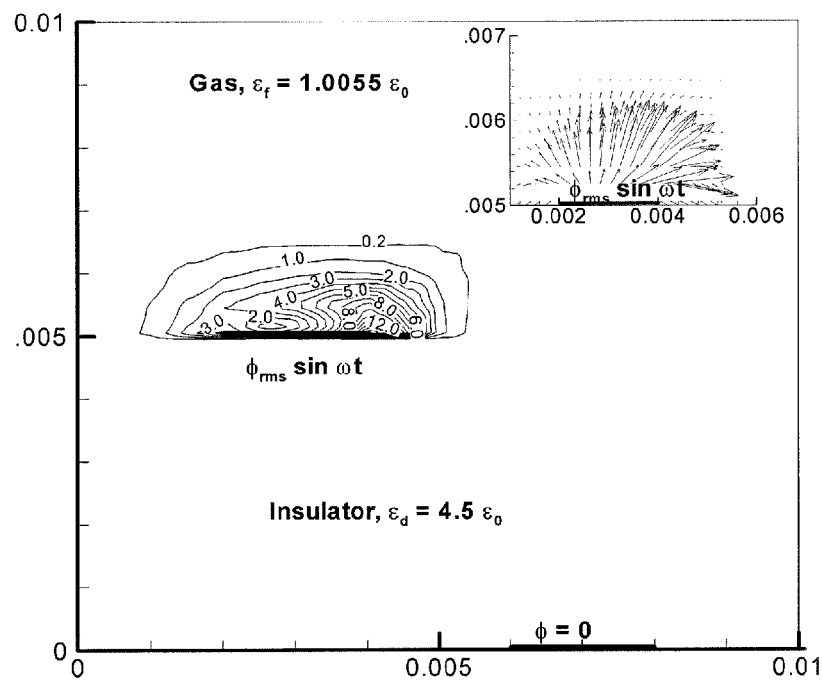
Figure 3C:
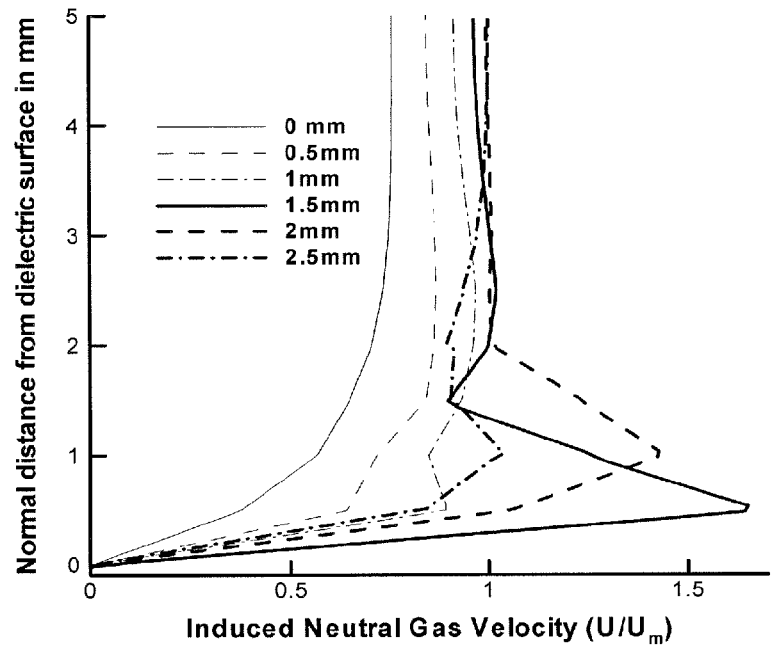

FIG. 3 illustrates the process through which electrodynamic qE body force actively controls the flow through in inducement of a wall jet even in helium working gas in quiescent condition (Roy, et al., APL, 2005). FIG. 3A shows the schematic for flow actuation using surface DBD. The variation of electric force qE about the electrode-dielectric surface in FIG. 3B describes a localized peak in the vicinity of the exposed electrode powered with a rf voltage of 1 kV rms at 5 kHz. The streamwise gas velocity profiles induced by this force are shown along different locations in FIG. 3C under quiescent gas environment.

Figure 4A:
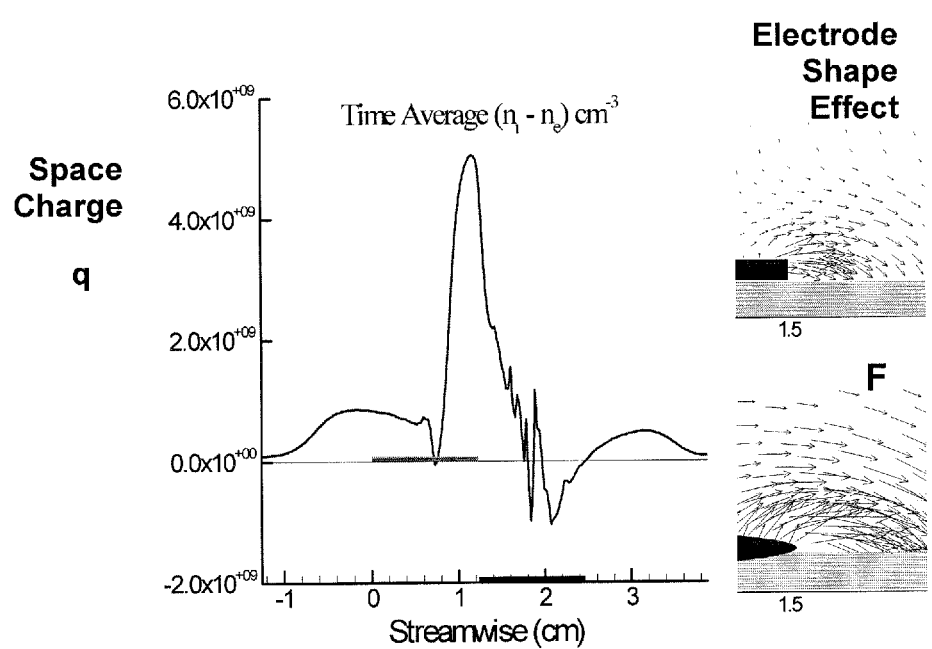
FIGS. 4A and 4B show the results from a numerical simulation, where
Figure 4B:
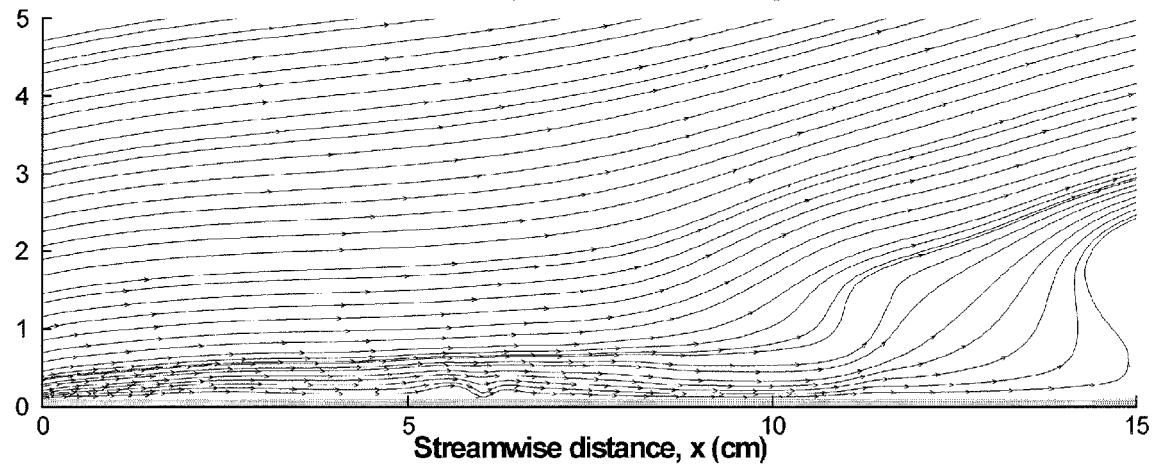
Figure 4B:
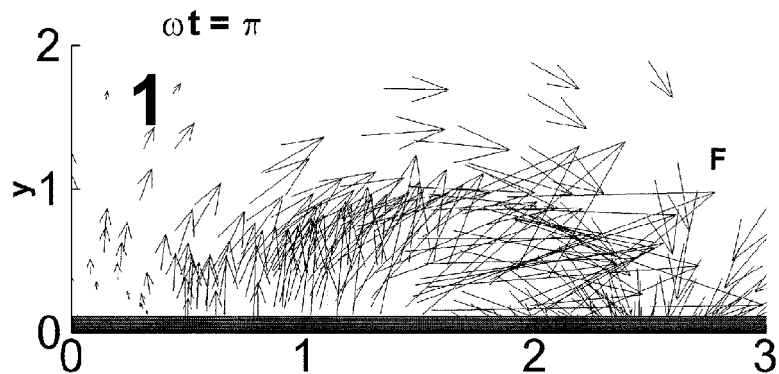
Figure 4B:
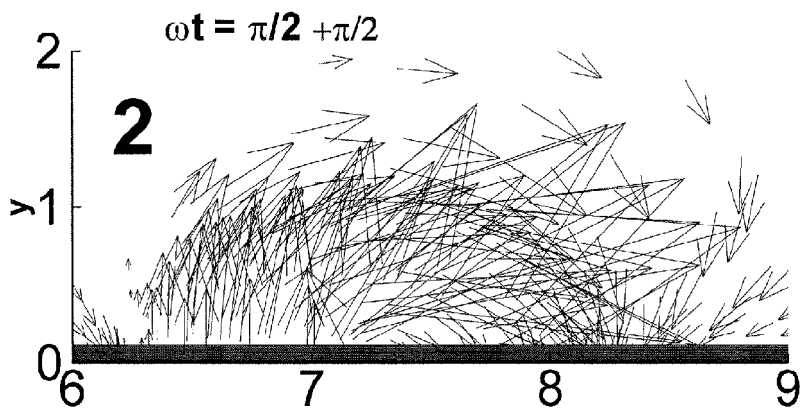

There have been several studies (Roth, 2003; Enloe et al, 2003; Roy et al., 2006) to understand the effect of electrical and geometric parameters on controlling the flow due to the electrodynamic force. FIG. 4 details such simulated effects due to electrode shape and power phase. A smaller radius induces more force due to higher electric field concentration (FIG. 4A). Also, powering the electrodes at a particular phase difference accentuates the induced forces to nearly double the wall jet velocity (FIG. 4B).

An embodiment of a wingless hovering of micro air vehicle can have enough lift to allow hovering of the craft. Typical unmanned aerial vehicles (UAVs) with wings have wingspans less than 15 cm. Embodiments of the subject invention may be even smaller than 15 cm. The Embodiments of a WHOMAV in accordance with the subject invention can have a smooth, continuous curvature surface and can have lift provided using electromagnetic techniques. A vortical fluid column can be induced by rf polyphase power supplied to a surface dielectric barrier discharge (DBD) located in the central hollow section of the WHOMAV. Application of rf polyphase power to the surface DBD can create sufficient upward, or downward, force for hovering, or landing. The outer surface of the WHOMAV, as well as the inner conical surface, can facilitate maneuverability of the craft. In specific embodiments, the nominal cruise speed of the WHOMAV is about 7-10 m/s (23-33 ft/s). There are several benefits associated with the wingless design of various embodiments of WHOMAVs in accordance with the invention. Such advantages include, but are not limited to, one or more of the following: no rotating components, no moving components, and active response to the surrounding flow conditions. Additionally, the separated flows at low Reynolds number condition associated with the MAVs can be minimized using accurate control of the electrodynamic body force through a feedback mechanism. The issue of low lift to drag ratio and degradation of airfoil efficiency due to the inability of laminar boundary layers attachment can also be substantially reduced or eliminated.

Figure 5A:
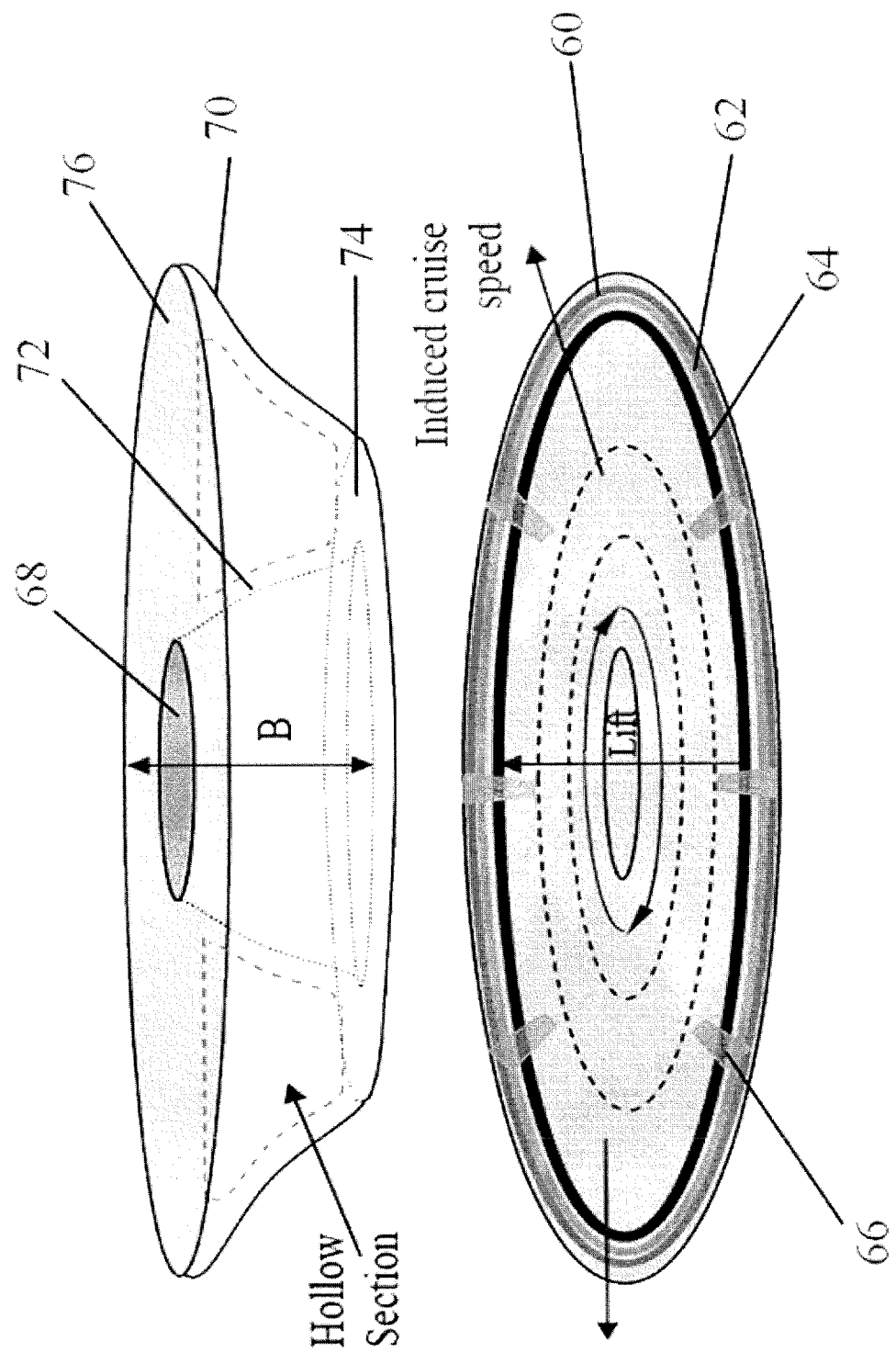
FIGS. 5A and 5B show an embodiment of the subject invention, where

The basic geometry of a WHOMAV in accordance with an embodiment of the subject invention may be a hollow donut with angularly curved shapes along the inside aperture and the outer surface. The conical shape can enhance the lift force through fluid acceleration for fast upward motion and to retard the downward motion for gradual landing. A schematic of such a coaxial device is shown in FIG. 5A. The inner surface forming the aperture through the WHOMAV can be sloped such that the diameter of the aperture at the top of the device is smaller than the diameter of the aperture at the bottom of the device. In an embodiment, the WHOMAV has an inner diameter greater than 3 cm, an outer diameter less than 11 cm, and a height less than cm. Further embodiments can utilize other configurations of electrodes, such as discontinuous circular electrodes along the periphery. Typical inner and outer average dimensions for an embodiment of the WHOMAV shown in FIGS. 5A and 5B may be 4 cm and 10 cm respectively, with a nominal height of 4 cm. The device can be designed as a hollow shell to reduce weight and increase structural rigidity. It can also assist in hosting the power source unit. In specific embodiments, the hollow body can be filled with a fluid different from the environmental fluid the device is located in. Examples include, but are not limited to, fluids lighter than the environmental fluid, in order to help lift the device, such as fluids lighter than air. A variety of materials can be used for the body of the device, including, but not limited to, carbonaceous type material, plastic, wood, such as balsa wood, metal, flexible material, and dielectric materials.

Referring to FIG. 5A, there are three concentric discontinuous circular electrodes 60, 62, and 64, which are broken into discontinuous sections by breaks 66, located on top surface 76. These concentric electrodes 60, 62, and 64 can be located with respect to the body layer forming the top surface 76, and/or the body layer forming bottom layer 74 much like the electrodes shown in FIG. 6A such that driving the electrode produces radial flow, toward or away from the center of the WHOMAV.

Driving the different segments positioned around the device with different driving voltages can allow a net force in one direction so as to assist in the horizontal movement of the device. Additional sets of the discontinuous concentric electrodes can be positioned on the top surface 76 to enhance the flow. In further embodiments, sets of electrodes with more than three electrodes in a set, as disclosed throughout this disclosure, can also be utilized. Embodiments can also incorporate the discontinuous circular electrodes on the inner surface 72 and/or the outer surface 70, to produce lift or a downward force. The circular electrode sets on the inner and/or outer surfaces can be continuous, if desired.

Figure 5B:
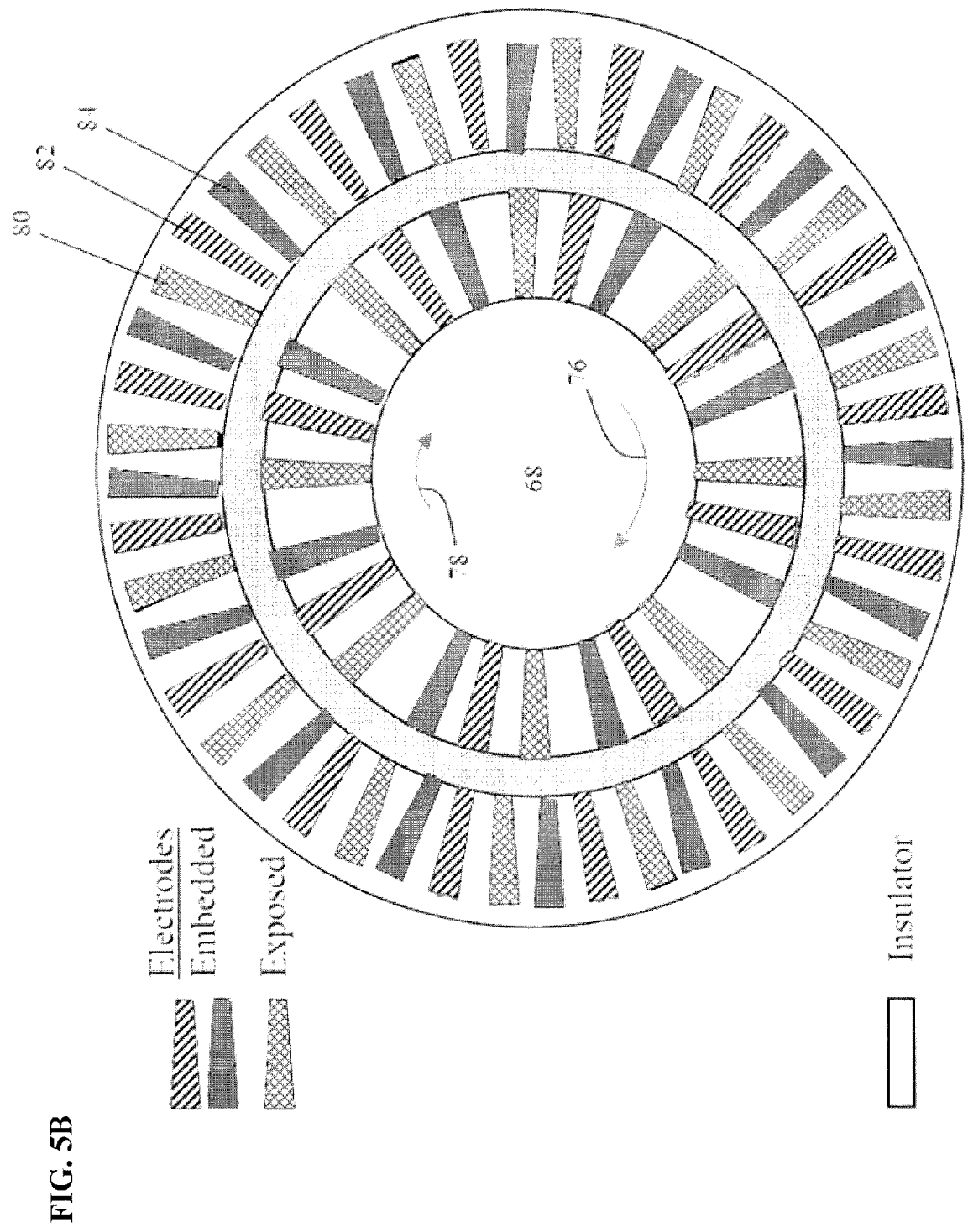
Figure 6A:
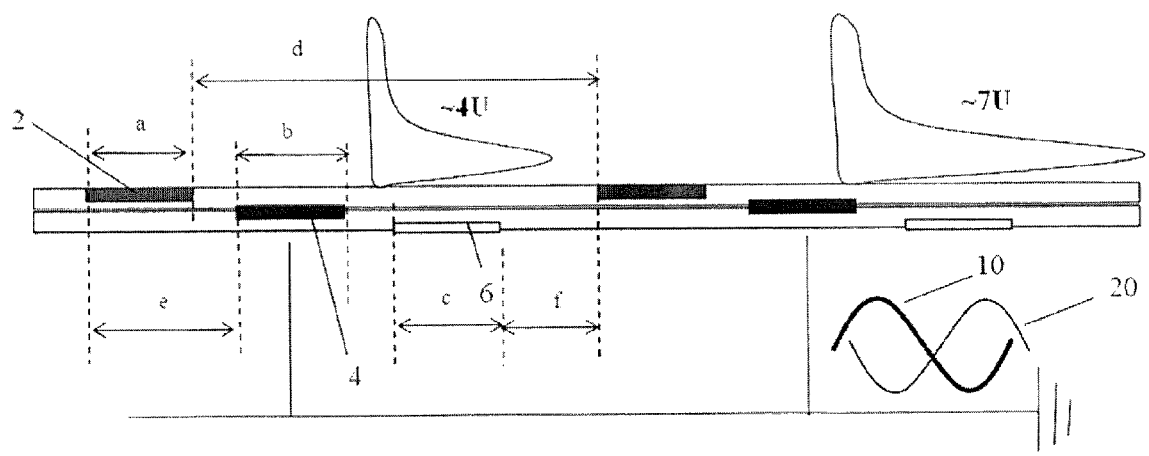
FIGS. 6A-6C show an electrode structure for a surface of an embodiment of the subject invention, where

Referring to FIG. 5B, multiple sets of electrodes 80, 82, and 84 are shown positioned on the inner surface 72 and the outer surface 70 of the device, much like the electrodes shown in FIG. 6A. Driving the multiple electrode sets on the inner and/or outer surface can produce a circular flow, such as 76 and 78, which can create a spinning wall jet and rotate the body of the WHOMAV. In further embodiments, sets of electrodes with more than three electrodes in a set, as disclosed throughout this disclosure, can also be utilized. Embodiments can also incorporate such sets of electrodes on the top and/or bottom surfaces of the device to produce circular flow and/or spin the device. These electrode sets can be selectively driven to produce flows that move the device in a horizontal direction and/or counteract detected wind or wind gusts.

Figure 6B:
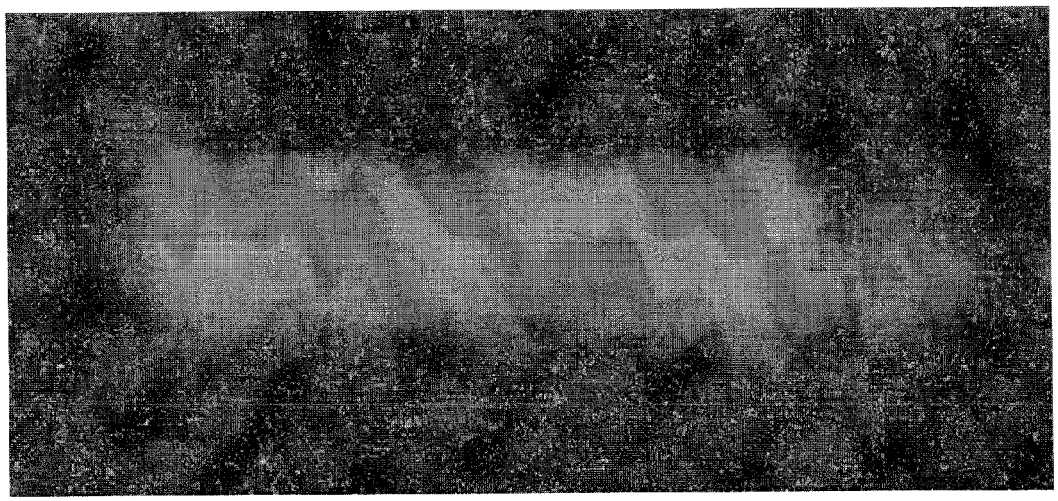

In additional embodiments, the size is easily scaled up or down and other geometries can be implemented. In the coaxial geometry, the inner and outer surfaces can be coated with layers of electrodes. These electrodes are selectively exposed or coated using, for example, a ceramic or polymer insulating sleeve. The arrangement of electrodes for the embodiment shown in FIG. 5A is shown in FIG. 5B. In an embodiment, a series of multilayer actuators can be utilized. A representative multilayer design schematic is shown in FIG. 6A. This arrangement has been tested for a single actuator on a flat plate using a 60 Hz frequency power supply. The resultant discharge is stable and extends over a larger region over the work surface (see FIG. 6B) producing nearly 4 times stronger peak of the wall jet. The physical parameters, such as a, b, and c, in FIG. 6A can be optimized for the desired performance of the actuator.

In an embodiment, the electrodes of the actuator shown in FIG. 6A can be powered at a selected phase difference. For a low mA range current and few hundred volts rms potential difference applied between the electrodes, a glow (micro) discharge plasma is generated with density $10^{12}$-$10^{13}$ cm$^{-3}$ due to an electric field of $10^6$-$10^7$ volt/cm. The thickness of this plasma is within a few Debye lengths, i.e., a few mm to less than a mm. The induced qE force is very local, but the Lorentz interaction of this body force with the surrounding fluid produces a gradually accelerating wall jet spinning along the conical inner and outer surface of the device. This spinning wall jet will induce a vortex of strength Γ. The generalized Kutta-Joukowski law states, $$F = \rho U \times \sum_{i=1}^{n} \Gamma_i,$$

where F is the total force on the system generated due to n vortices in a free stream of U. Thus, sufficient lift force can be generated for hovering using the flow control mechanism described below. The electrodes can be arranged such that a controlled circulation Γ can be maintained. In an embodiment, the multilayer arrangement of electrodes shown in FIG. 5A can be utilized, so as to allow a horizontally induced velocity of up to 7-10 m/s through the flow control mechanism described below.

Paschen's law dictates the most energy efficient point for ionization in a working medium is the Stoletow point. For air, a minimum breakdown voltage of 360 V and a product of gas pressure and the distance between the electrodes p·d=5.7 Torr-mm is required for maximum ionization. For flow control, with applications near atmospheric pressure, the allowable electrode spacing necessary for maximum volumetric ionization is d=77 microns. An embodiment utilizing a multilayer micro actuator design can achieve such electrode spacing. As an alternative to a monolayer actuator, a multilayer actuator can be utilized. The multilayer actuator can have several layers of dielectric, each enveloping an electrode.

Figure 1B:
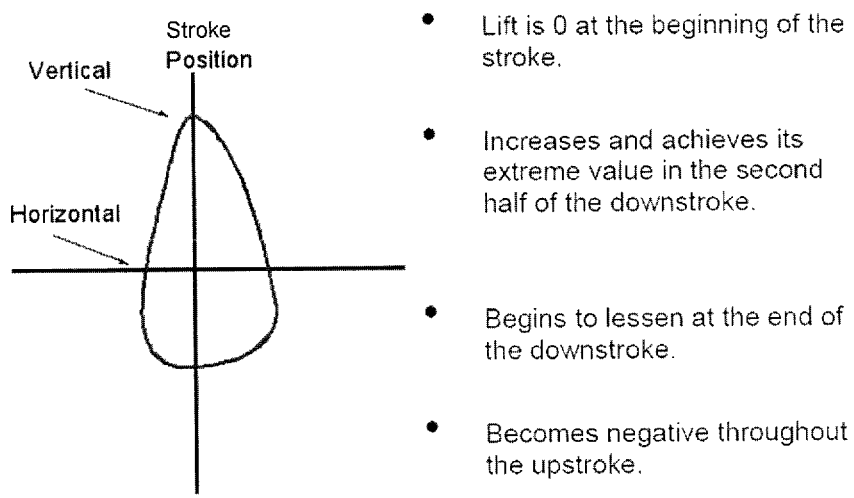
Figure 2A:
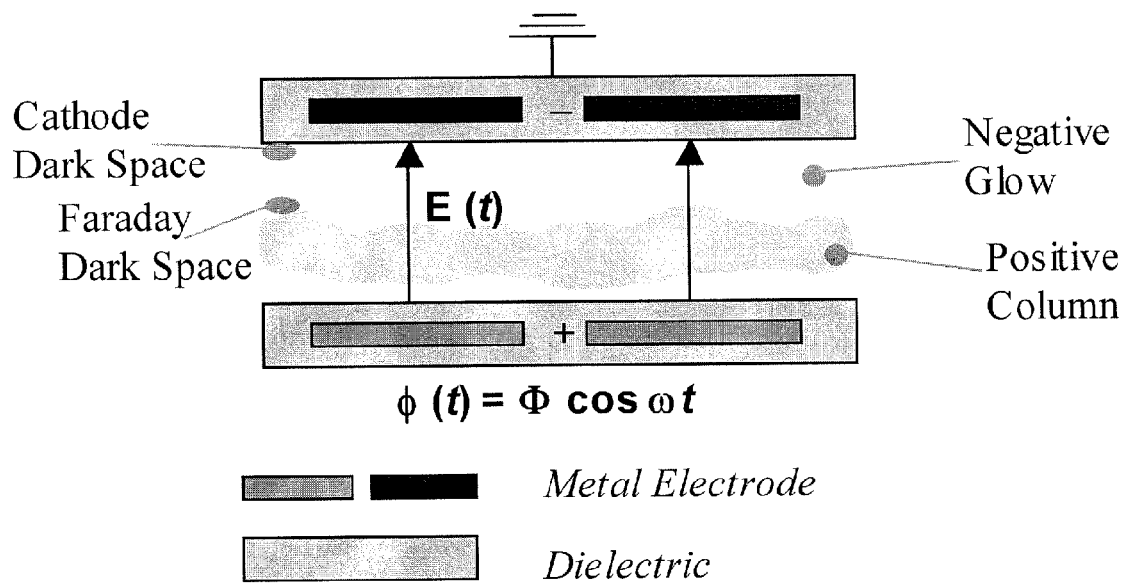
FIGS. 2A-2D show a schematic of a standard RF glow discharge monolayer actuator, where
Figure 2B:
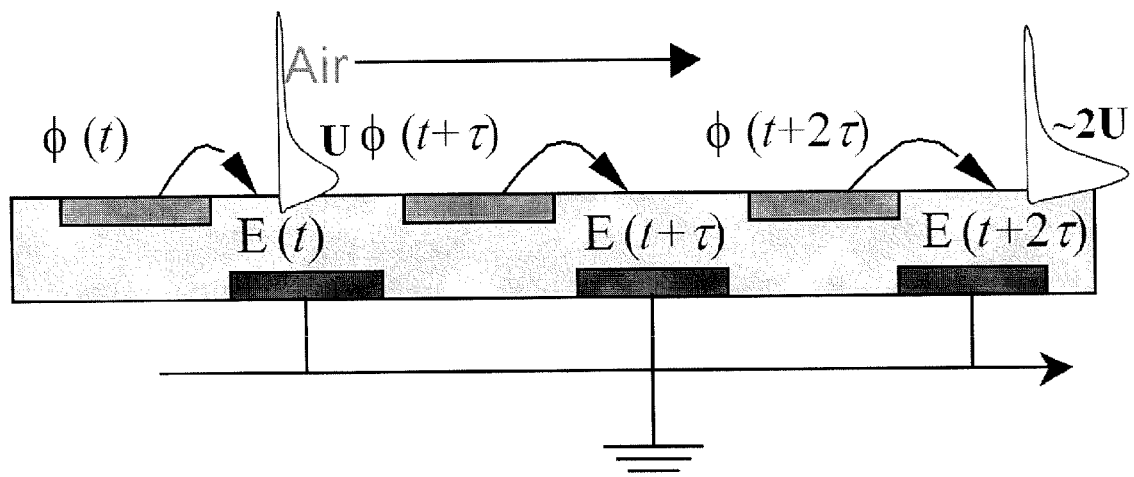
Figure 2C:
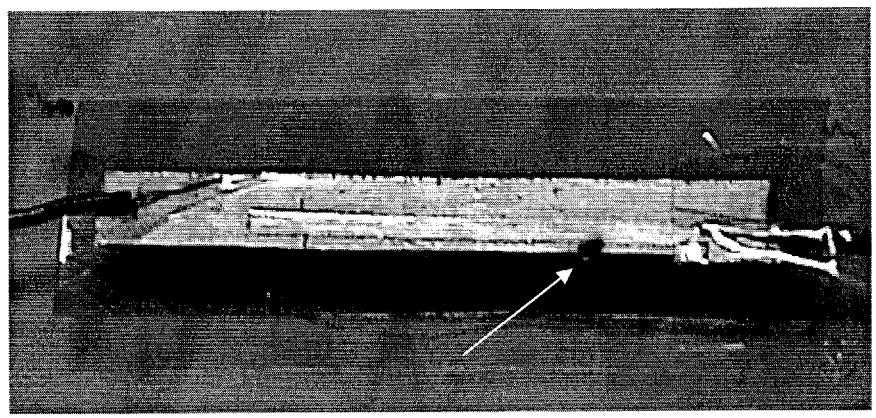
Figure 2D:
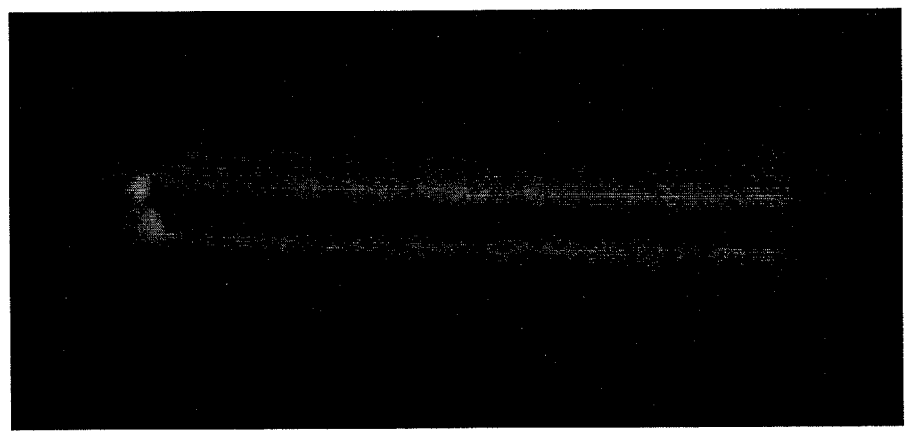
Figure 6C:
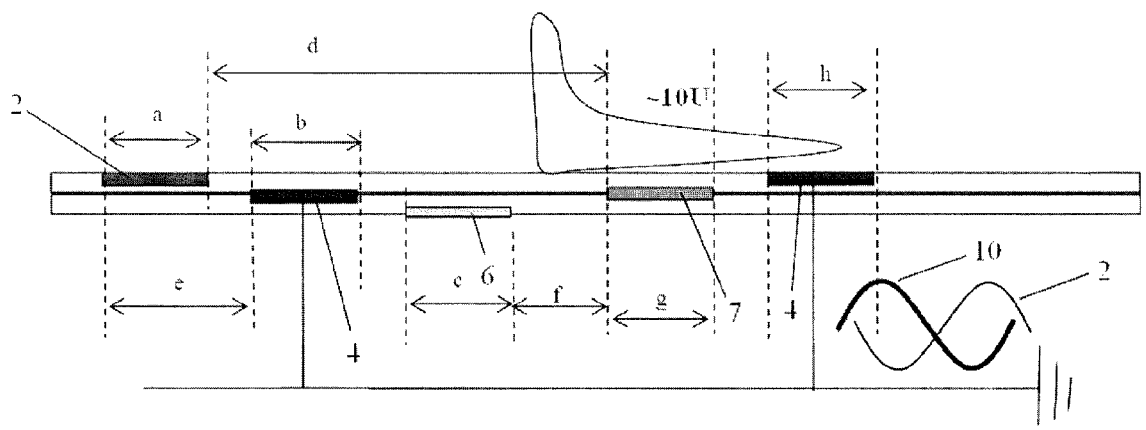

FIG. 6A shows a schematic for a bi-layer embodiment. In an embodiment, the interelectrode distance d is kept at a few microns, reducing or eliminating the kHz rf power requirement. Voltage 10 is applied between electrode 2 and electrode 4, and voltage 20 is applied between 6 and electrode 4. For a test shown in FIG. 6B, the electrodes are powered with wall ac supply (60 Hz) through neon transformers and tested for a steady glow, which extends to a much greater width than the monolayer design shown in FIG. 1. Measurements show at least four times increase in the induced jet velocity (~4 U). In an embodiment, a set of phase lagged electrodes powered by a pulsed ac/dc supply can be used. The induced wall jet from such a set of phase lagged electrodes can be improved by an order of magnitude, that is up to about 7-10 m/s. Such an induced wall jet magnitude can be sufficient for a reasonable cruise speed of an embodiment of the subject WHOMAV. FIG. 6C shows an embodiment similar to the embodiment of FIG. 6A, with an additional electrode 7 that can be driven with respect to ground electrode 4, out of phase with electrodes 2 and 6, to enhance the flow.

Figure 7:
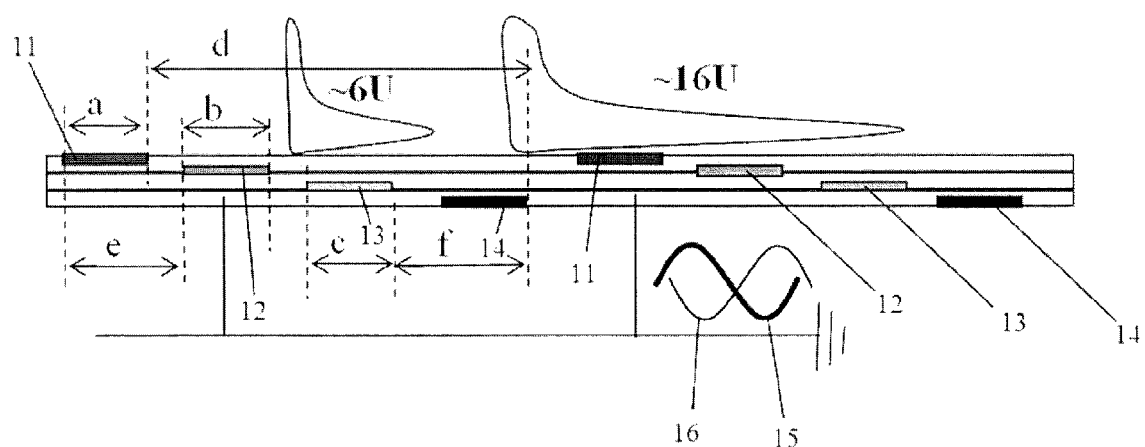
FIG. 7 is a schematic diagram of a second embodiment of a multilayer actuator of the present disclosure, with an increased number of layers.
Figure 9:
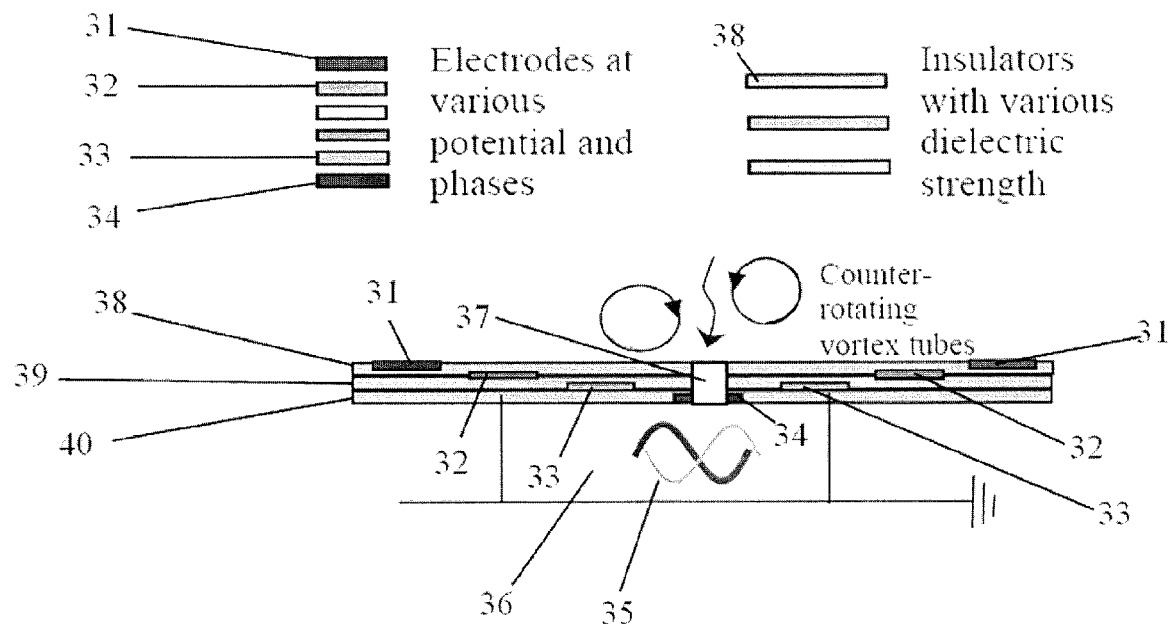
FIG. 9 shows an electrode structure that can be utilized to produce counter-rotating vortexes, which can cause air flow through an aperture.

FIG. 7 shows an extremely large acceleration gain (i.e. >15 U induced velocity) for the multilayer arrangement. The voltage pattern 15 is applied between the electrode 11 nearest the surface and the ground electrode 13, while the voltage pattern 16 is applied between electrode 12 and the ground electrode 13. This may be achieved for the same energy density of plasma as of a monolayer arrangement. In additional embodiments, the number of layers can be increased to increase the plasma coated surface area. This means more EHD body force and resulting gas velocity are induced. Also, at this velocity, small scale turbulence may dominate the flow actuation process. Further, the micron level insulator thickness may influence the induced force. The electrodes can be positioned and driven in a variety of configurations and patterns, respectively, to induce a variety of flow patterns. As an example, as shown in FIG. 9, flow actuation may be used for creating large or small counter rotating vortices. Based on the applied phase difference, these counter rotating vortex tubes can be slightly or greatly misaligned. FIG. 9 shows aperture 37 that can be, for example, the aperture 68 of the device such that the counter rotating vortex tubes drive flow through aperture 37. In an embodiment, various vortex structures similar to those forming about different body shapes can be created. For example, the Karman vortex street for flow over a cylindrical object can be easily generated for electrode sets operating at a phase difference of $\pi/2$ with a select duty cycle. A powerful alternative for the synthetic jets can also be implemented with this design.

Figure 8:
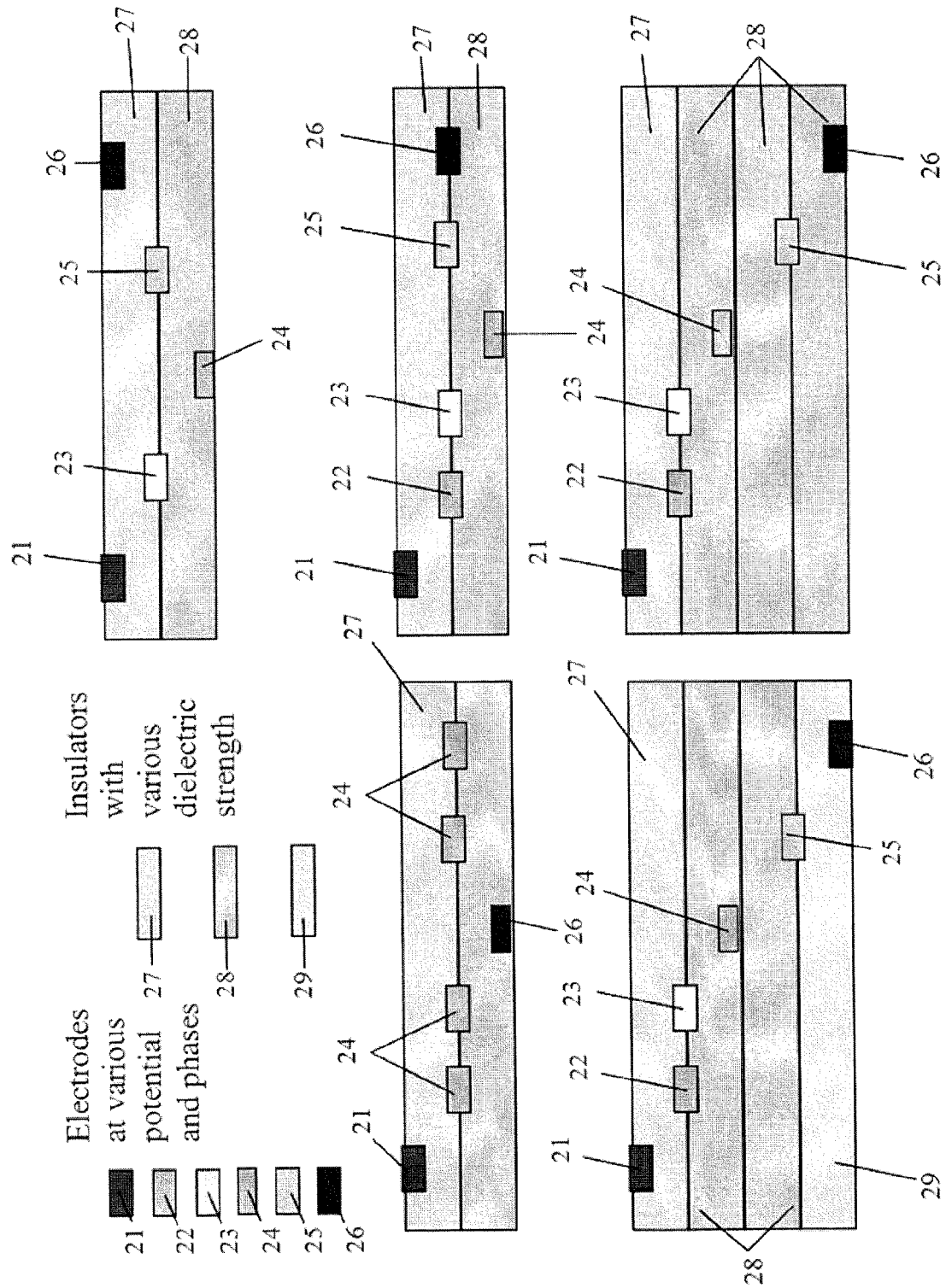
FIG. 8 illustrates several additional exemplary embodiments of the multilayer actuators in accordance with the invention.
Figure 10:
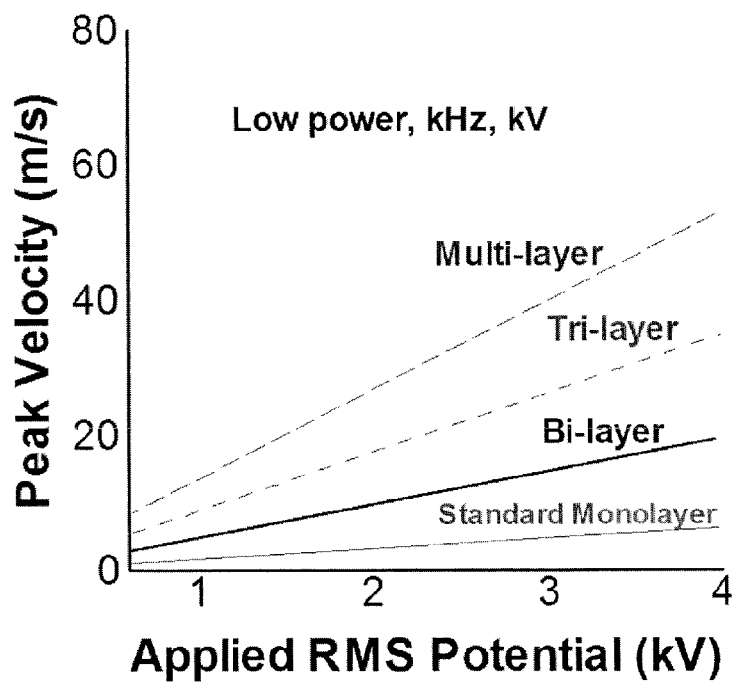
FIG. 10 shows the estimated velocity increase for several embodiments of multi barrier plasma actuators (MBPA) in accordance with the invention.
Figure 11:
FIG. 11 shows the discharge for an embodiment of an actuator design for lift enhancement in accordance with the invention.
Figure 12:
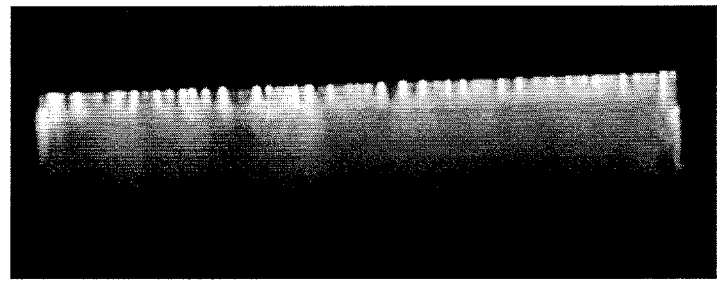
FIG. 12 shows the discharge for an embodiment of an actuator in accordance with the invention, which shows a wide (about 4 cm) glow for thrust enhancement.
Figure 13:
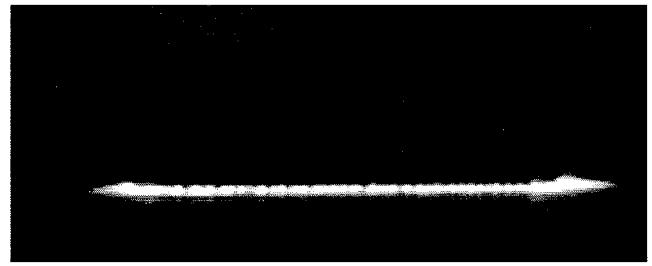
FIG. 13 shows a discharge photograph from the side of an embodiment of an actuator in accordance with the invention, which shows the thickness of the plasma in comparison to the hand in the left.
Figure 14:
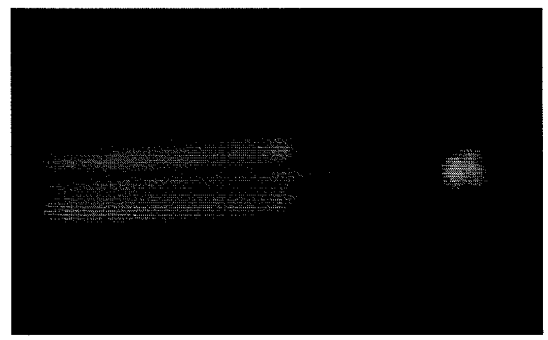
FIG. 14 shows an embodiment of a new plasma actuator with a very wide glow (about 6 cm) in accordance with the invention.
Figure 15A:
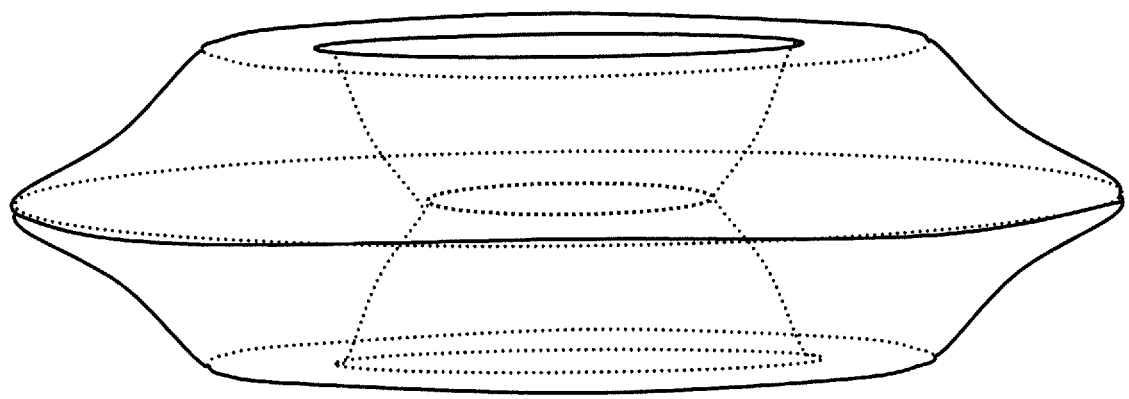
FIGS. 15A-15D show configurations for various embodiments of the subject invention.
Figure 15B:
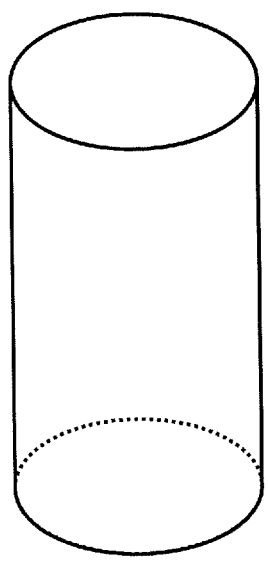
Figure 15C:
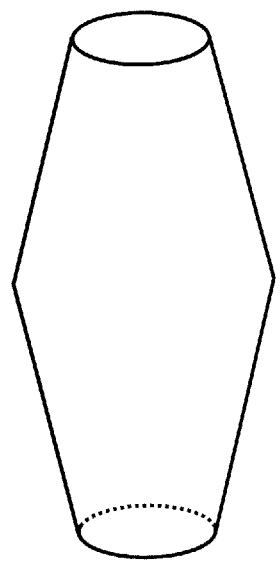
Figure 15D:
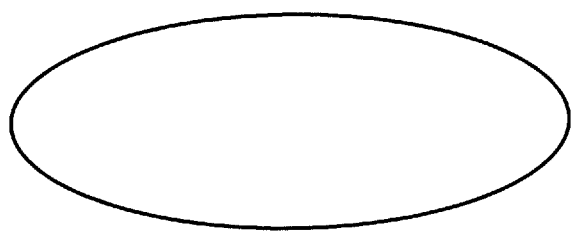
Figure 16A:
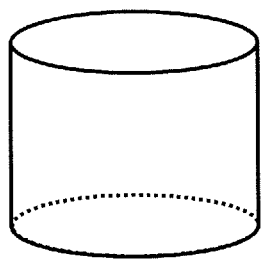
FIGS. 16A-16C show examples of continuous loop electrodes that can be incorporated with embodiments of the invention.
Figure 16A:
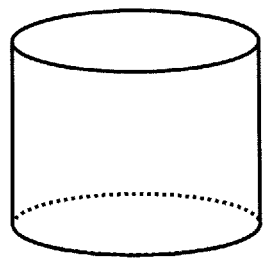
Figure 16B:
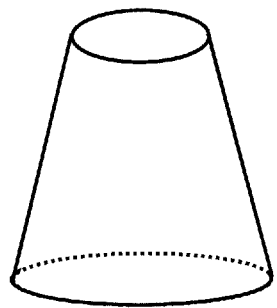
Figure 16B:
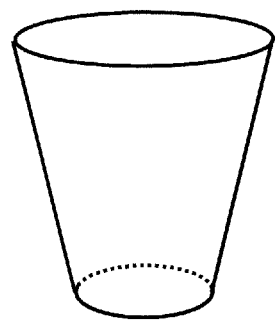
Figure 16C:
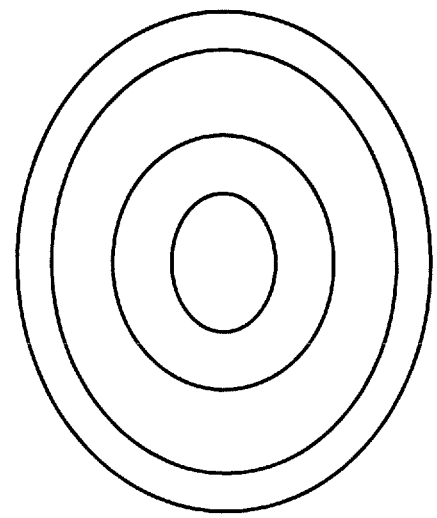
Figure 17A:
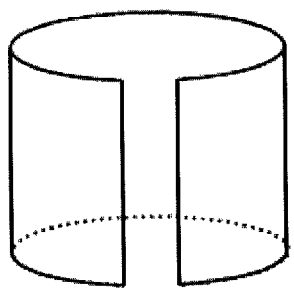
FIGS. 17A-17C show examples of segmented loop electrodes that can be incorporated with embodiments of the invention.
Figure 17A:
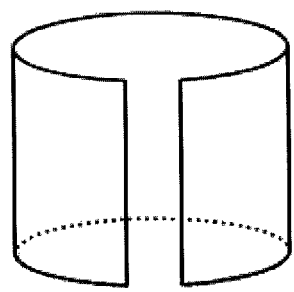
Figure 17B:
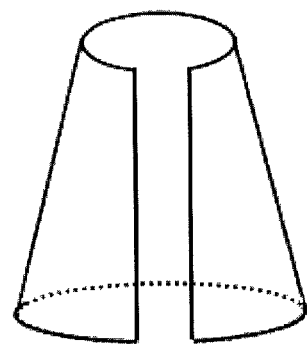
Figure 17B:
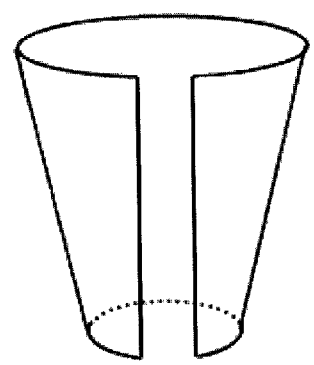
Figure 17C:
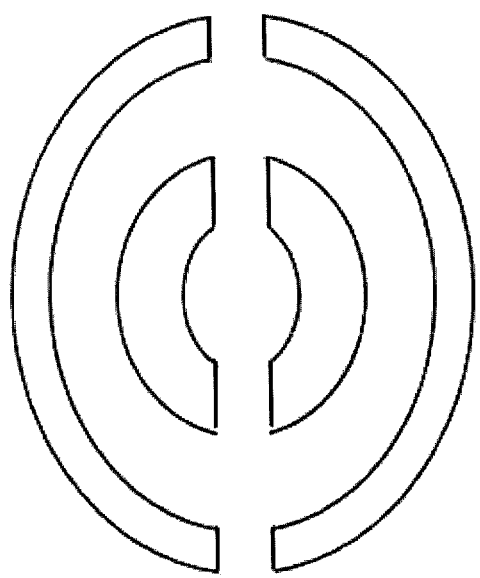

FIG. 8 illustrates several additional exemplary embodiments of the multilayer actuators in accordance with the subject invention, showing various geometric and electrical configurations. Various insulator materials such as KAPTON™ and TEFLON™ and their combinations, for example, can be utilized for minimum heat loss inside the dielectric material. Multilayer actuators of the present invention may have any number of insulation layers, insulation thicknesses, dielectric strengths, numbers of electrodes, electrode widths, interelectrode gaps, applied frequencies, duty cycles, and voltages, for example. FIG. 10 shows the estimated velocity increase for embodiments of multi barrier plasma actuators (MBPA) in accordance with the subject invention. FIG. 11 shows the discharge for an embodiment of an actuator design for lift enhancement in accordance with the subject invention. FIG. 12 shows the discharge for an embodiment of an actuator, which shows a wide (about 4 cm) glow for thrust enhancement. FIG. 13 shows a discharge photograph from the side for an embodiment of the invention, which shows thickness of the plasma in comparison to the hand in the left. FIG. 14 shows an embodiment of a plasma actuator with a very wide glow (about 6 cm) in accordance with the subject invention.

In traditional winged MAVs the control surfaces are open to the wind and, thus, very sensitive to wind gusts of speeds comparable to vehicle flight speeds. Embodiments of the subject WHOMAV can have a physical weight similar to that of traditional MAV's. The subject WHOMAV can have two major advantages. First, the subject WHOMAV has an internal surface not exposed to wind gusts and is, thus, minimally affected by the unsteadiness of the surrounding flow. Second, this surface can also be utilized to control the inertia by manipulating the acceleration in the vertical direction. Power management techniques for traditional MAV's can be can be incorporated with specific embodiments of the subject WHOMAV's. Energy efficiency may also be improved by using micro actuators. Incorporating an internal surface not exposed to wind gusts, which can also be utilized to control the inertia by manipulating the acceleration in the vertical direction, can allow maneuverability and gust tolerance, and can allow the management of massive, time-dependent separations, which would typically stall traditional MAV wings. Additionally, the separated flows at low Reynolds number condition associated with the MAV's can be reduced, or minimized, using accurate control of the electrodynamic body force through a feedback mechanism. An unconventional MEMS local skin friction/shear stress sensor can also be used to detect flow response in accordance with an embodiment of the subject WHOMAV.

In an embodiment, the electrodes can be tethered to a high-voltage supply and to instruments in order to accurately monitor the operation and to determine under what conditions the lift-off will take place. In a further embodiment, more electrodes may be mounted around the periphery of the external surface of the circular plane. These electrodes can also be connected to the high-voltage supply and can produce a motion in the horizontal direction. The velocity and temperature of the gas flow can be monitored by the instruments while the circular device is floating in the air. Experimental data can be obtained and reviewed, such that, the locations of the electrodes can be optimized so that the minimum amount of power is used for the desired vertical lift and the horizontal motion of the device.

In another embodiment, the power supply is located within the WHOMAV without causing a significant increase in the overall mass of the WHOMAV. In a specific embodiment, this can be achieved by using an epoxy-resin encapsulated high-voltage source with a MOSFET-based driving circuit technology.

FIGS. 15A-15D show configurations for specific embodiments of the subject wingless electromagnetic air vehicle, where details of the electrode placement are not shown. Other configurations can also be implemented.

FIGS. 16A-16C and 17A-17C show various continuous loop electrode structures respectively, that can be utilized with embodiments of the invention. Spiral electrode structures can also be utilized.

Figure 18A:
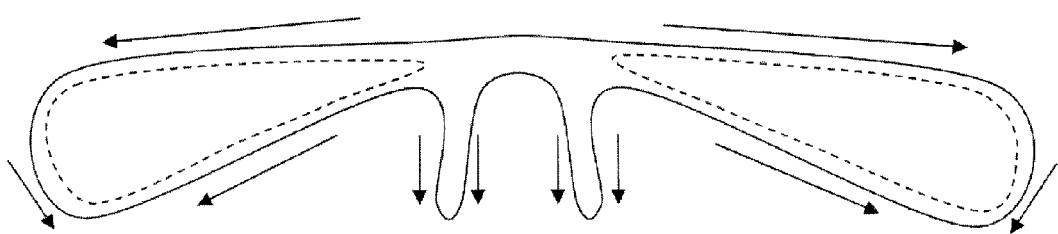
FIGS. 18A-18B show power blanket and electrode integrated plasma wheel configurations, which illustrate direction of forces along the surface. All force directions are reversible lift, decent and flight.
Figure 18B:
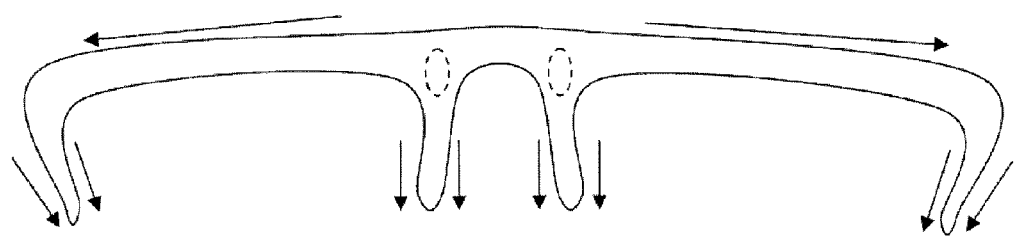

FIGS. 18A and 18B show a power blanket and electrode integrated plasma wheel configuration that can be implemented in accordance with the subject invention, where the arrows show the direction of forces along the surface of the vehicle. These forces can be reversed as needed by exciting the electrodes appropriately, for example, to apply forces needed for lift, descent, and flight.

Figure 19A:
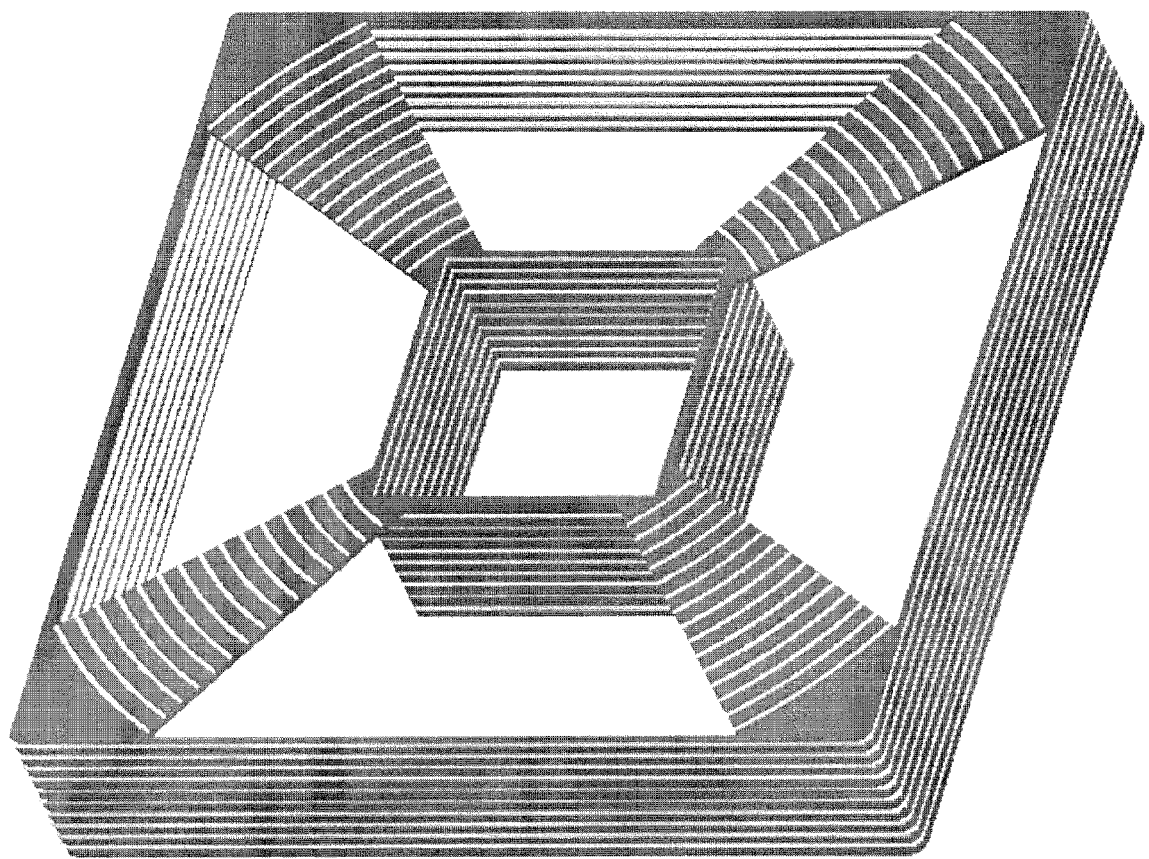
FIGS. 19A-19B show two basic structures suitable for WEAV.
Figure 19B:
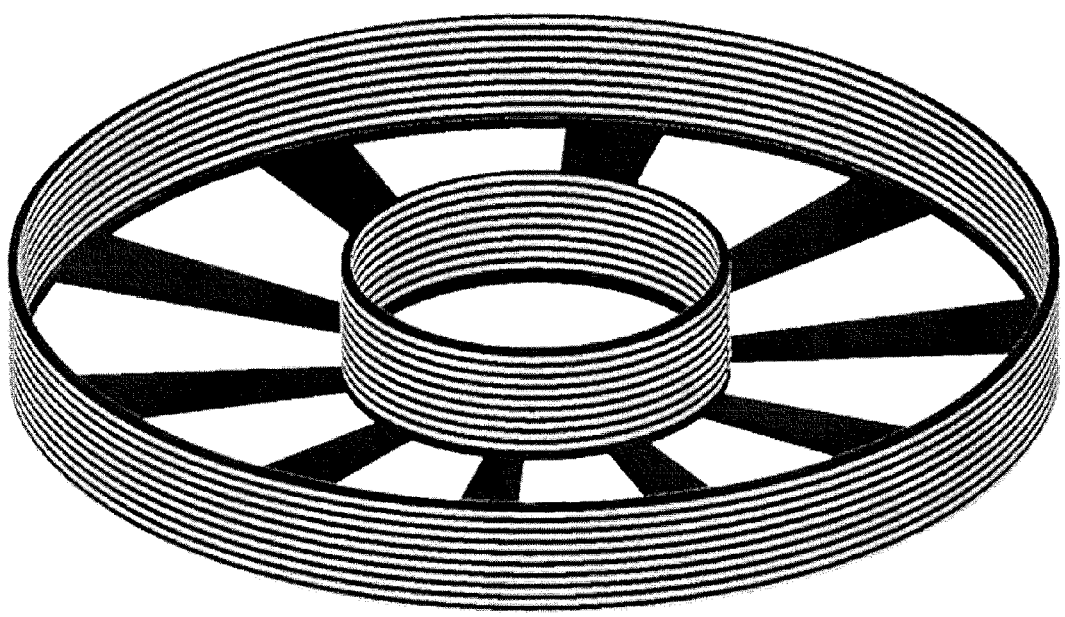

FIGS. 19A and 19B show two additional structures that can be used with a wingless air vehicle in accordance with the invention. FIG. 19A shows concentric square cross-section pipes connected by connected elements that hold the concentric square cross-section pipes together. FIG. 19B shows concentric circular cross-section pipes connected by connecting elements that hold the concentric circular cross-section pipes together. The outer and inner surfaces of the concentric pipes are shown to incorporate electrodes positioned so as to be able to create forces to lift and control the vehicle. In FIG. 19A, the connecting elements are also shown to incorporate electrodes for providing forces for lift and/or control of the vehicle. Such electrodes can also be used with the connecting elements of the embodiment shown in FIG. 19B. Other cross-section shapes of concentric pipes can also be used, such as polygonal, hexagonal, octagonal, or other desired shape. Further, the concentric pipes can have different cross-sectional shapes, additional concentric pipes can be added, and other combinations of connecting elements can be used.

Figure 20A:
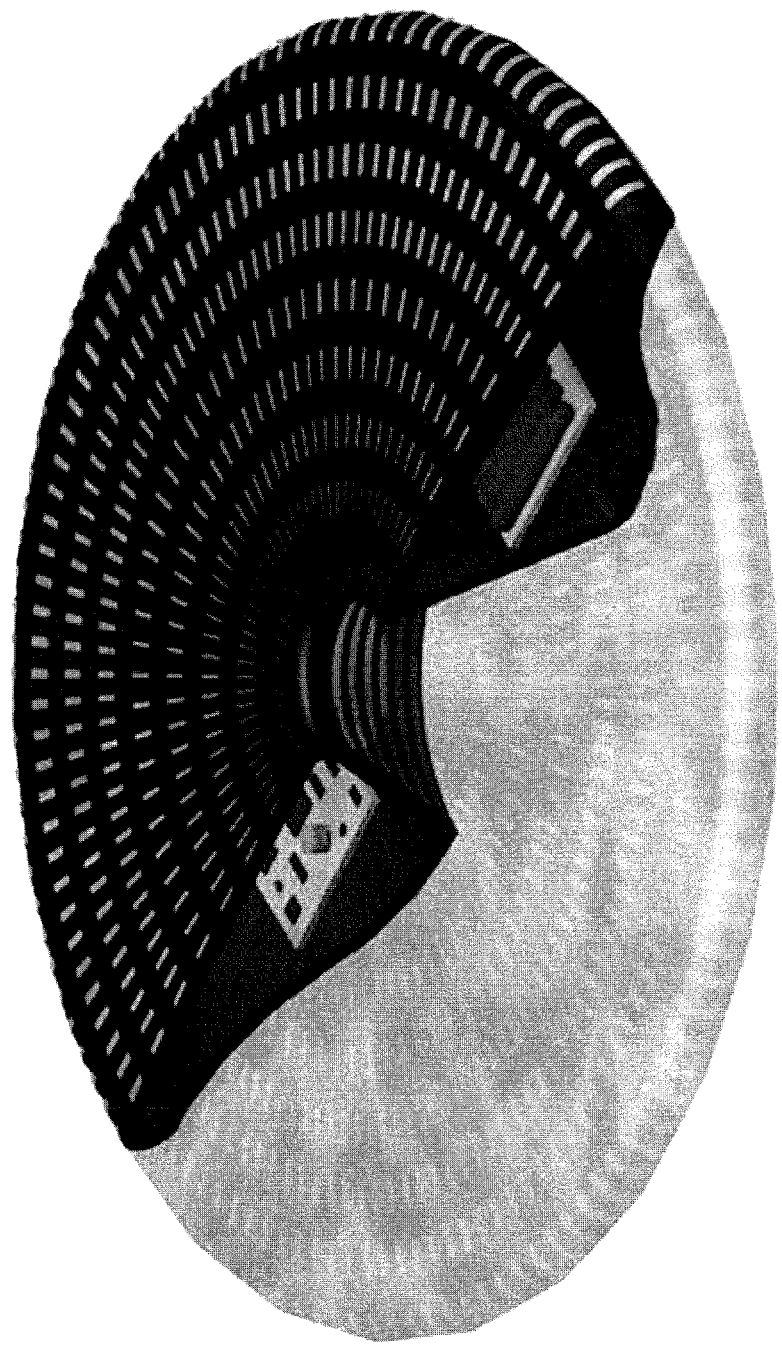
FIGS. 20A-20C show a schematic of WEAV physics.
Figure 20B:
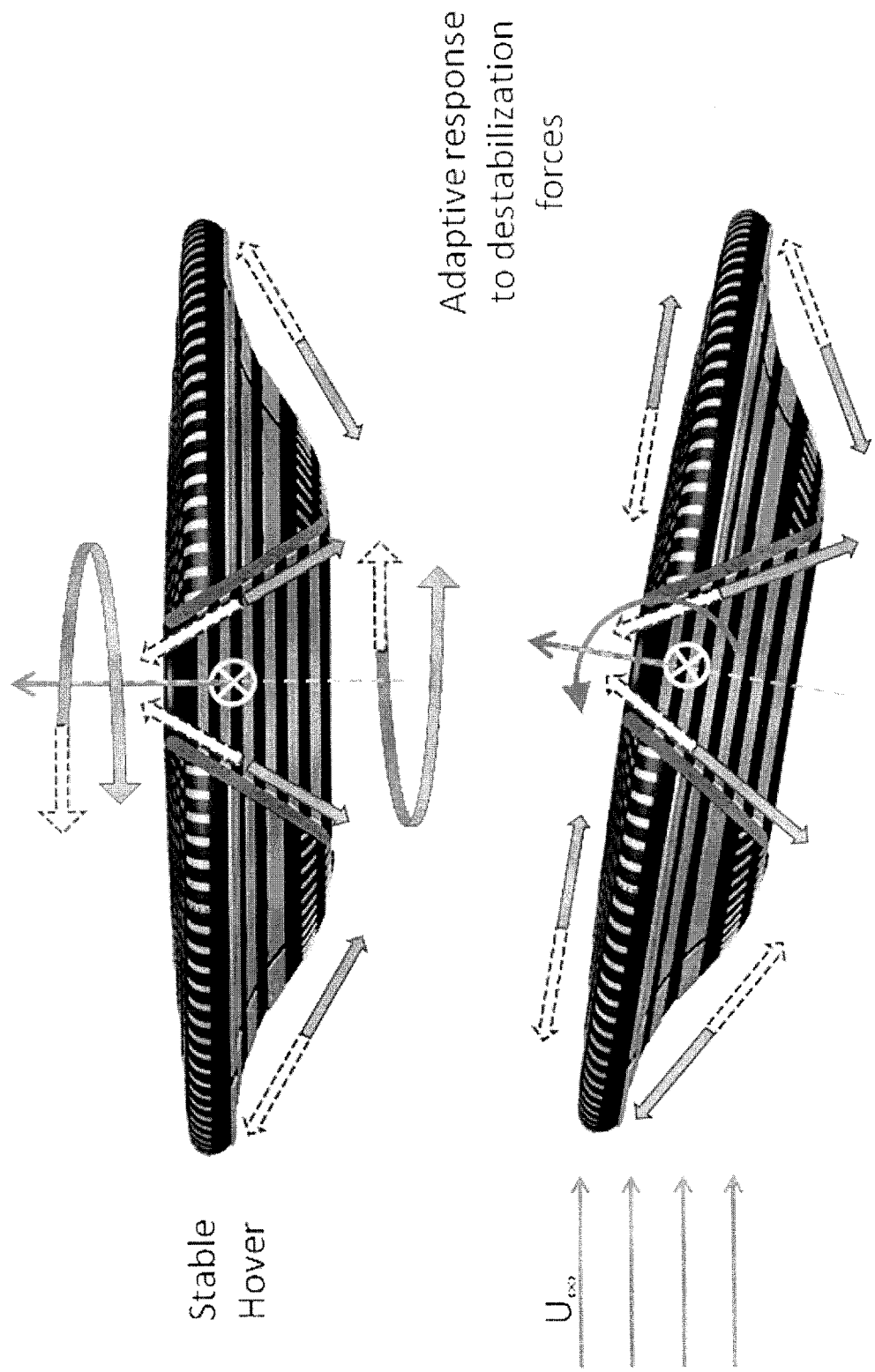
Figure 20C:
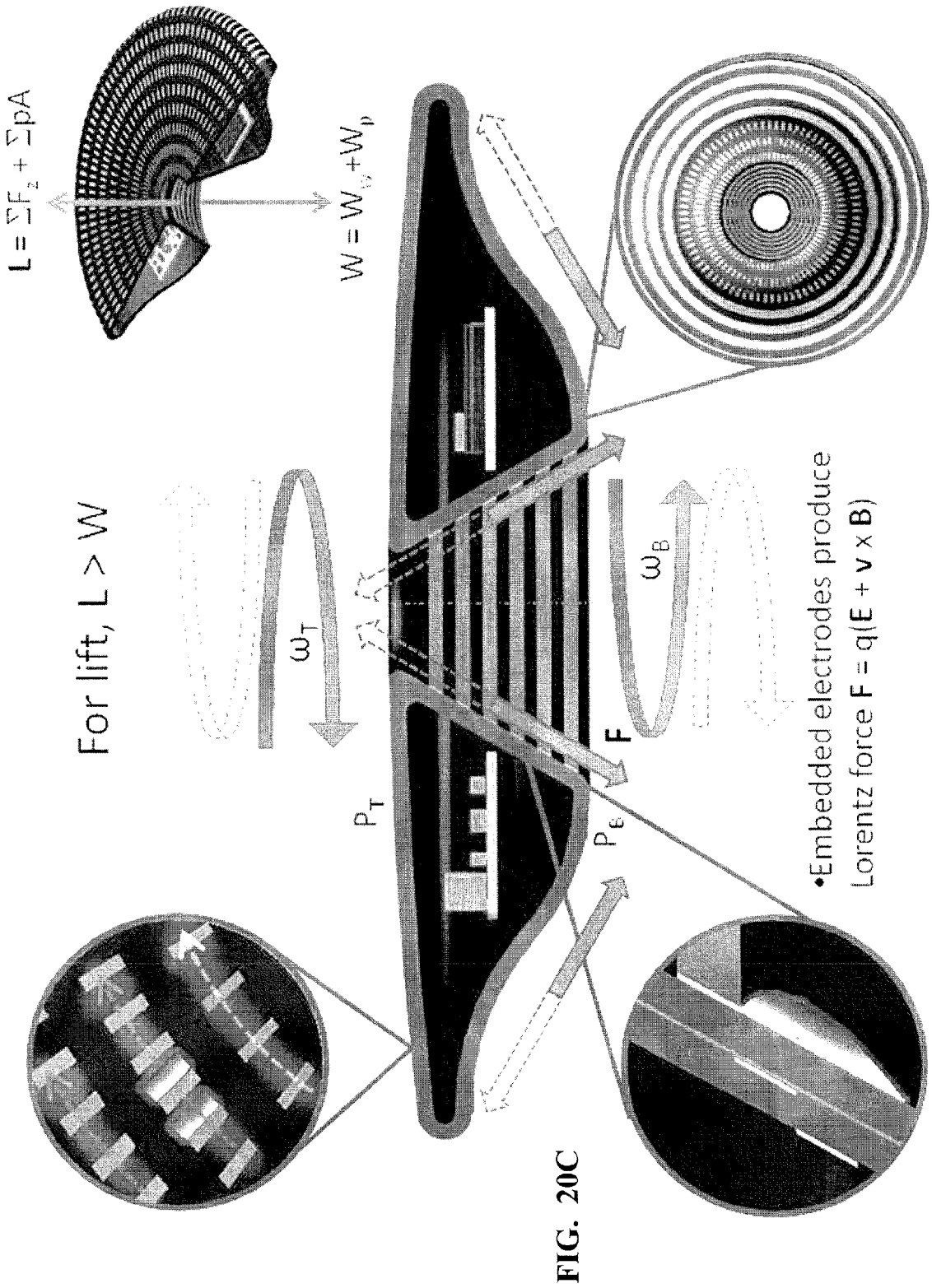

In an embodiment having a coaxial geometry as shown in FIGS. 20A-20B, the inner and outer surfaces are coated with layers of electrodes. These electrodes are selectively exposed or coated using, for example, a ceramic or polymer insulating sleeve. The arrangement of electrodes is shown in FIG. 20A. A corresponding force vector schematic that can be implemented is shown in FIG. 20C. There are three types of forces shown working on the actuators. First, the Lorentz force F due to the discharge at the inner core. Second, the fluid dynamic force $\Sigma pA$ generated by the pressure (p) difference generated from the rotation of air on the top and bottom surface areas (A) induced by the segmented electrodes. Note that the top has a significantly larger surface area than the bottom. For hovering, the components of these two forces together in the vertical direction (L) have to balance the weight of the craft ($W_w$) plus the payload ($W_p$). Third, the Magnus force generated due to the gust that will be helpful to stabilize the system. Additionally, plasma actuators on the outer curved surface can be suitable for largely separated flow attachments, notorious for stalling the rotocrafts and flapping winged MAVs. With respect to the embodiment shown in FIGS. 20A-20C, even under gust conditions, the internal core will be able to generate lift. The hover stability control mechanism for an embodiment of the invention, which can be referred to as a wingless electromagnetic air vehicle (WEAV), is shown in FIG. 20B. Interestingly, the curved electrodes may induce larger lift during gust than in quiescent condition. There are several possible electrode arrangements for embodiments of the subject WEAV including, but not limited to, tethered and non-tethered geometry configurations, general configuration with and without through holes, segmented and continuous loop electrodes, and spiral.

Figure 21:
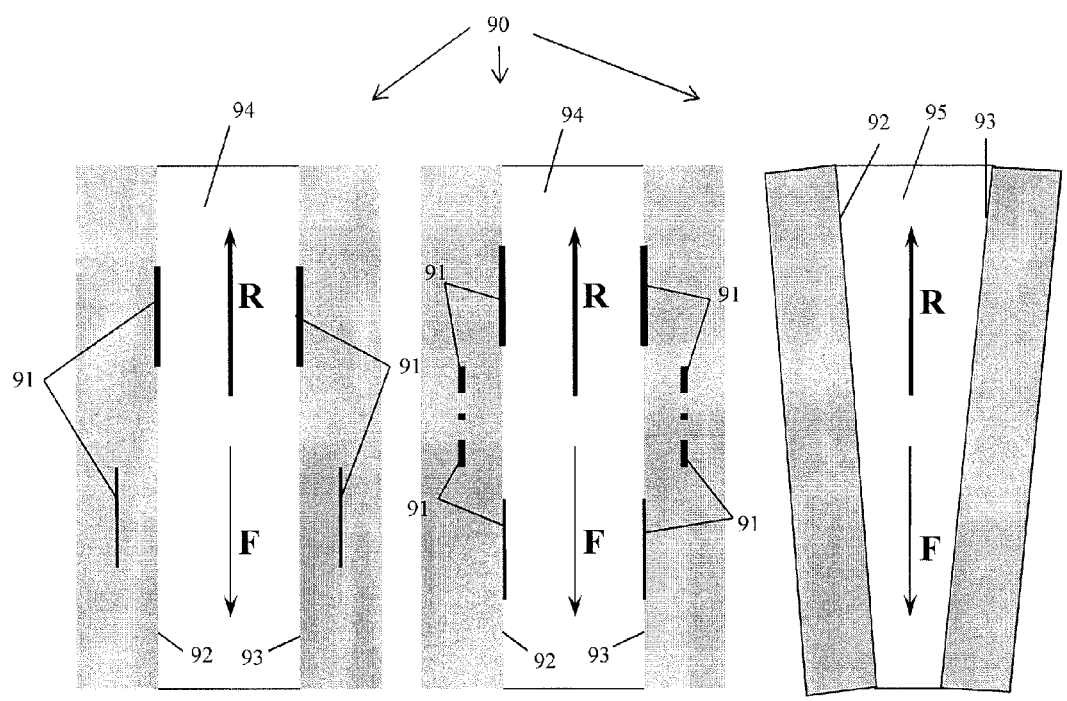
FIG. 21 shows different hollow wall structures for WEAV.

Various embodiments of the invention can incorporate one or more hollow walls 90 that incorporate electrode structures 91 capable of creating a fluid force to create a force tending to move the vehicle. The hollow wall structures 90 shown in FIG. 21 show cross-section of walls 90 with electrodes 91 embedded in the surfaces. F denotes fluid force due to electric force and R is the reaction with which the vehicle (WEAV) moves. These two thin active surfaces 92, 93 may be parallel 94 or may have a varying gap 95 with a minimum of a few micrometers. In specific embodiments, the gap between the active surfaces is in the range 0.1 μm-1 cm and in another specific embodiment in the range 0.5 mm-5 mm.

In specific embodiments, the surface of the vehicle can be flexible so as to better withstand gusts of wind and respond to wind shear. In a further embodiment the vehicle can be encapsulated, partially or wholly, with a dielectric jacket maintained in a closed proximity to the electrode surface for safety and guidance of the induced fluid jet.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

REFERENCES

1. Anderson, R. and Roy, S., AIAA-2006-369.
2. Ashpis, D. and Hultgren, L., AIAA-2003-1025.
3. Bityurin, V. A., Bocharov, A. N., Lineberry, J. T., and Suchomel, C., "Studies on MHD interaction in hypervelocity ionized air flow over aero-surfaces," AIAA 2003-4303, 2003.
4. Bush, W. B., "Magnetohydrodynamic-hypersonic flow past a blunt body," *Journal of Aerospace Science*, Vol. 25, 1958, p. 685.
5. Colozza, A., NIAC Phase I Report, Planetary Exploration Using Biomimetics, November 2000.
6. Corke, T. C., Jumper, E. J., Post, M. L., Orlov, D. and McLaughlin, T. E., AIAA-2002-0350.
7. Gaitonde, D., Visbal, M. and Roy, S., AIAA-2006-1205.
8. Gaitonde, D., Visbal, M. and Roy, S., AIAA-2005-5302.
9. Jüttner, B., *IEEE Trans. Plasma Sci*. PS-15 (1987) 474-480.
10. Kimmel, R., Hayes, J., Menart, J. and Shang, J., "Effect of Magnetic Fields on Surface Plasma Discharges at Mach 5," AIAA-2004-2661, Jun. 28-Jul. 1, 2004.
11. Kumar, H. and Roy, S., Physics of Plasmas, 12 (9), 093508, 2005.
12. Kuo, S. P. and Bivolaru, D., "A physical mechanism of the plasma effect on shock waves," AIAA 2003-0527, Jan. 6-9, 2003.
13. Leonov, S, Bityurin, V., and Yarantsev, D. "The effect of plasma induced separation," AIAA 2003-3852, Jun. 23-26, 2003.
14. Leonov, S. B. and Bityurin, V. A., AIAA-2002-5209.
15. Miles, R. B., AIAA-2000-2324.
16. Menart, J., Shang, J., Kimmel, R. and Hayes, J. "Effects of magnetic fields on plasma generated in a Mach 5 wind tunnel," AIAA 2003-14165, Jun. 23-26, 2003.
17. Menart, J., Malik, S., and Lin, L., "Coupled radiative, flow and temperature analysis of a free-buring arc," *Journal of Physics D: Applied Physics*, Vol. 33, pp. 1-13, 2000.
18. Roth, J. R., Physics of Plasmas, 10 (5), 2117 (2003).
19. Roy, S., 2005, "Flow actuation using radio frequency in partially-ionized collisional plasmas," Applied Physics Letters, 86 (10) 101502.
20. Roy, S. and D. Gaitonde, 2005, "Modeling surface discharge effects of atmospheric RF on gas flow control," AIAA-2005-0160, 43rd Aerospace Sciences Mtg., Reno, Nev.
21. Roy, S. and D. Gaitonde, 2004, "Radio frequency induced ionized collisional flow model for application at atmospheric pressures," J. Appl. Physics, 96 (5) 2476-2481.
22. Roy, S., B. P. Pandey, J. Poggie and D. Gaitonde, 2003, "Modeling low pressure plasma-sheath with space charge effect," Physics of Plasmas, 10 (6) 2578-2585.
23. Roy, S., 2004, "Self consistent electrode model for magnetoplasmadynamic thrusters application," AIAA-2004-3469, 40th Joint Propulsion Conference, Fla.

24. Roy, S., P. Mikellides and D. R. Reddy, 2002, "Effective conversion of exit enthalpy in a MPD thruster," AIAA-2002-0917, 40$^{th}$ Aerospace Science Meeting, Reno, Nev.
25. Roy, S. and Gaitonde, D., Physics of Plasmas, 13 (2), 023503, 2006.
26. Roy, S., Singh, K. P. and Gaintonde, D., Applied Physics Letters, v88, n12, 121501, 2006.
27. Roy, S., Singh, K. P., Kumar, H., Gaitonde, D. and Visbal, M., AIAA-2006-0374.
28. Shneider, M. N., Macheret, S. O., and Miles, R. B., "Non-equilibrium magnetohydrodynamic control of scramjet inlets," AIAA 2002-2251, May 20-23, 2002.
29. Shang, J. S., Hayes, J., Menart, J., and Miller, J., "Blunt body in hypersonic electromagnetic flow field," *Journal of Aircraft*, Vol. 30, p. 314, 2003.
30. Singh, K. P. and Roy, S., Journal of Applied Physics, v98, n8, 083303, 2005.
31. Ziemer, R. W., "Experimental investigations in magneto-aerodynamics," *American Rocket Society Journal*, Vol. 29, 1969, p. 642.

The invention claimed is:
1. An air vehicle, comprising:
a body having an aperture therethrough;
a plurality of electrode pairs positioned proximate a surface of the body; and
a voltage source, where the voltage source applies a corresponding plurality of voltages across the plurality of electrode pairs, wherein application of the plurality of voltages across the plurality of electrode pairs creates a corresponding plurality of dielectric barrier discharges that creates a corresponding plurality of plasmas and causes a corresponding plurality of electrohydrodynamic effects that create a corresponding plurality of near-surface forces, wherein a cumulative effect of the plurality of near-surface body forces creates a vortical fluid column in the aperture that causes the air vehicle to hover.
2. The air vehicle according to claim 1, wherein the body has a disc shape.
3. The air vehicle according to claim 1, wherein the body has an outer diameter less than 15 cm.
4. The air vehicle according to claim 1, further comprising:
a second plurality of electrode pairs positioned proximate the surface of the body, wherein the voltage source applies a corresponding second plurality of voltages across the second plurality of electrode pairs, wherein application of the second plurality of voltages across the second plurality of electrode pairs creates a corresponding second plurality of dielectric barrier discharges that creates a corresponding second plurality of plasmas and causes a corresponding second plurality of electrohydrodynamic effects that create a corresponding second plurality of near-surface forces, wherein a second cumulative effect of the second plurality of near-surface body forces creates a force in the vertical direction.
5. The air vehicle according to claim 1, wherein the plurality of electrode pairs is positioned proximate an internal portion of the surface of the body, wherein the internal portion of the surface of the body faces toward the aperture through the body.
6. The air vehicle according to claim 4, wherein the second plurality of electrode pairs is positioned proximate an external portion of the surface of the body, wherein the external portion of the surface of the body faces radially outward from the air vehicle.
7. The air vehicle according to claim 1, further comprising:
one or more sensors to measure the surrounding flow conditions.
8. The air vehicle according to claim 2, wherein the disc shaped body has an outer diameter less than 11 cm.
9. The air vehicle according to claim 1, wherein the aperture has a diameter greater than 3 cm.
10. The air vehicle according to claim 1, wherein the body has a height less than 5 cm.
11. The air vehicle according to claim 1, wherein the body comprises a hollow portion.
12. The air vehicle according to claim 11, wherein the hollow portion of the body is filled with a fluid that is lighter than air.
13. The air vehicle according to claim 1, wherein at least two electrode pairs of the plurality of electrode pairs share a ground electrode.
14. The air vehicle according to claim 1, further comprising:
a power source unit, wherein the power source unit powers the voltage source.
15. The air vehicle according to claim 14, wherein the power source unit is located within the body.
16. The air vehicle according to claim 1, wherein the plurality of electrode pairs comprises a corresponding plurality of ground electrodes and a corresponding plurality of exposed electrodes, wherein the plurality of exposed electrodes is located on the surface of the body.
17. The air vehicle according to claim 16, wherein the plurality of electrode pairs further comprises a corresponding plurality of one or more additional electrodes, wherein the voltage source applies a corresponding plurality of one or more additional voltages across each additional electrode of the corresponding one or more additional electrodes and the ground electrode creates one or more additional dielectric barrier discharges that create one or more additional plasmas and causes a corresponding one or more additional electrohydrodynamic effects that create.
18. The air vehicle according to claim 17, wherein the plurality of one or more additional voltages is out of phase with the plurality of voltages.
19. The air vehicle according to claim 17, wherein each electrode of the plurality of electrode pairs and the corresponding one or more additional electrodes of the plurality of one or more additional electrode pairs form a corresponding portion of a discontinuous circular electrode set.
20. The air vehicle according to claim 1, wherein the body has an outer diameter greater than 15 cm.
21. The air vehicle according to claim 2, wherein the disc shaped body has an outer diameter greater than 1 meter.
22. The air vehicle according to claim 1, wherein the body comprises:
a first plurality of concentric circular cross-section pipes through which the aperture is present; and
a second plurality of concentric circular cross-section pipes at an outer surface of the body.
23. The air vehicle according to claim 1, wherein the body comprises:
a first plurality of concentric square cross-section pipes through which the aperture is present; and
a second plurality of concentric square cross-section pipes at an outer surface of the body.
24. The air vehicle according to claim 1, wherein a wall of the body comprises a hollow gap therethrough, wherein a first wall surface of the wall is exposed to the hollow gap and a second wall surface of the wall is exposed to the hollow gap such that the hollow gap is between the first wall surface and the second wall surface, wherein the first wall surface comprises at least one gap electrode pair positioned proximate the first wall surface, wherein the voltage source applies a corresponding at least one voltage across the at least one gap electrode pair, wherein application of the at least one voltage across the at least one gap electrode pair creates a corresponding at least one dielectric barrier discharge that creates a corresponding at least one plasma and causes a corresponding at least one electrohydrodynamic effect that creates a corresponding at least one near-surface body force.

25. An air vehicle, comprising:
a body;
a plurality of electrode pairs positioned proximate a surface of the body;
a voltage source, wherein the voltage source applies a corresponding plurality of voltages across the plurality of electrode pairs, wherein application of the plurality of voltages across the plurality of electrode pairs creates a corresponding plurality of plasmas and causes a corresponding plurality of electrohydrodynamic effects that create a corresponding plurality of near-surface forces, wherein a cumulative effect of the plurality of near-surface body forces from the plurality of electrode pairs creates a force that causes the air vehicle to hover.

26. The air vehicle according to claim 25, wherein the body has a disc shape.

27. The air vehicle according to claim 25, wherein the body has an outer diameter less than 15 cm.

28. The air vehicle according to claim 25, wherein the body has an outer diameter greater than 1 meter.

29. The air vehicle according to claim 25, further comprising:
a second plurality of electrode pairs positioned proximate the surface of the body, wherein the voltage source applies a corresponding second plurality of voltages across the second plurality of electrode pairs, wherein application of the second plurality of voltages across the second plurality of electrode pairs creates a corresponding second plurality of dielectric barrier discharges that creates a corresponding second plurality of plasmas that creates a corresponding second plurality of near-surface body forces, wherein a second cumulative effect of the plurality of near-surface body forces from the second plurality of electrode pairs creates a force in the vertical direction.

30. The air vehicle according to claim 29, wherein the second plurality of electrode pairs is positioned proximate an external portion of the surface of the body, wherein the external portion of the surface of the body faces radially outward from the air vehicle.

31. The air vehicle according to claim 25, further comprising:
one or more sensors to measure the surrounding flow conditions.

32. The air vehicle according to claim 25, further comprising:
a power source unit, wherein the power source unit powers the voltage source.

33. The air vehicle according to claim 32, wherein the power source unit is located within the body.

34. The air vehicle according to claim 25, wherein the plurality of electrode pairs comprises a corresponding plurality of ground electrodes and a corresponding plurality of exposed electrodes, wherein the plurality of exposed electrodes is located on the surface of the body.

35. The air vehicle according to claim 34, wherein the plurality of electrode pairs further comprises a corresponding plurality of one or more additional electrodes, wherein the voltage source applies a corresponding plurality of one or more additional voltages across each additional electrode of the corresponding one or more additional electrodes and the ground electrode creates one or more additional dielectric barrier discharges that create one or more additional plasmas and causes a corresponding one or more additional electrohydrodynamic effects that create a corresponding one or more additional near-surface body forces.

36. The air vehicle according to claim 35, wherein each electrode pair of the plurality of electrode pairs and the corresponding one or more additional electrodes of the plurality of one or more additional electrode pairs form a corresponding portion of a discontinuous circular electrode set.

37. The air vehicle according to claim 25, wherein each electrode of the plurality of electrode pairs is curved.

38. The air vehicle according to claim 25, wherein a wall of the body comprises a hollow gap therethrough, wherein a first wall surface of the wall is exposed to the hollow gap and a second wall surface of the wall is exposed to the hollow gap such that the hollow gap is between the first wall surface and the second wall surface, wherein the first wall surface comprises at least one gap electrode pair positioned proximate the first wall surface, wherein the voltage source applies a corresponding at least one voltage across the at least one gap electrode pair, wherein application of the at least one voltage across the at least one gap electrode pair creates a corresponding at least one dielectric barrier discharge that creates a corresponding at least one plasma and causes a corresponding at least one electrohydrodynamic effect that creates a corresponding at least one near-surface body force.

39. The air vehicle according to claim 25, wherein the body has an outer diameter greater than 15 cm.

40. The air vehicle according to claim 1, wherein the voltage source is an RF voltage source, wherein the plurality of voltages is a plurality of RF voltages.

41. The air vehicle according to claim 25, wherein the voltage source is an RF voltage source, wherein the plurality of voltages is a plurality of RF voltages.

* * * * *

UNITED STATES PATENT AND TRADEMARK OFFICE
CERTIFICATE OF CORRECTION

PATENT NO.        : 8,960,595 B2                                            Page 1 of 1
APPLICATION NO.   : 13/720773
DATED             : February 24, 2015
INVENTOR(S)       : Subrata Roy It is certified that error appears in the above-identified patent and that said Letters Patent is hereby corrected as shown below:

IN THE CLAIMS

Column 14,
Line 38, "effects that create." should read --effects that create a corresponding one or more additional near-surface body forces.--.

Column 15,
Line 14, "proximate a surface of the body;" should read --proximate a surface of the body; and--.

Signed and Sealed this
Thirteenth Day of October, 2015

Michelle K. Lee
*Director of the United States Patent and Trademark Office*